(12) United States Patent
Hotta et al.

(10) Patent No.: US 11,536,215 B2
(45) Date of Patent: Dec. 27, 2022

(54) STRADDLED VEHICLE ENGINE UNIT AND STRADDLED VEHICLE

(71) Applicants: YAMAHA HATSUDOKI KABUSHIKI KAISHA, Iwata (JP); DENSO CORPORATION, Kariya (JP)

(72) Inventors: Minoru Hotta, Aichi (JP); Yoshihiko Nonogaki, Aichi (JP); Kazuteru Iwamoto, Shizuoka (JP); Hisatoshi Kinoshita, Shizuoka (JP); Nobuyuki Kawashima, Shizuoka (JP)

(73) Assignees: YAMAHA HATSUDOKI KABUSHIKI KAISHA, Iwata (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/473,908

(22) Filed: Sep. 13, 2021

(65) Prior Publication Data

US 2021/0404406 A1    Dec. 30, 2021

Related U.S. Application Data

(63) Continuation-in-part of application No. PCT/JP2020/006043, filed on Feb. 17, 2020.

(30) Foreign Application Priority Data

Mar. 13, 2019 (JP) .............................. JP2019-045539

(51) Int. Cl.
| | | |
|---|---|---|
| *F02D 41/22* | (2006.01) | |
| *B62M 7/02* | (2006.01) | |
| *F02D 41/00* | (2006.01) | |

(52) U.S. Cl.
CPC .............. *F02D 41/22* (2013.01); *B62M 7/02* (2013.01); *F02D 41/009* (2013.01); *F02D 2200/101* (2013.01)

(58) Field of Classification Search
CPC .... F02D 41/1498; F02D 41/22; F02D 41/009; F02D 41/0092; F02D 2200/101;
(Continued)

(56) References Cited

U.S. PATENT DOCUMENTS 5,471,869 A * 12/1995 Kuroda .................. G01M 15/11
                                                73/114.04
5,506,778 A    4/1996 Matsumoto et al.
(Continued)

FOREIGN PATENT DOCUMENTS

| EP | 3450735 A1 | 3/2019 |
|---|---|---|
| JP | H0783108 A | 3/1995 |

(Continued)

*Primary Examiner* — George C Jin
(74) *Attorney, Agent, or Firm* — Rabin & Berdo, P.C.

(57) ABSTRACT

A straddled vehicle engine unit including an internal combustion engine and a misfire detection device. The internal combustion engine has a crankshaft, and a crank angle signal output unit that periodically outputs a crank angle signal in accordance with rotation of the crankshaft. The internal combustion engine is configured to repeat at least two kinds of strokes on a cycle of every 720-degree rotation of the crankshaft. The misfire detection device includes a crankshaft rotation speed fluctuation physical quantity acquisition unit configured to acquire a physical quantity related to an amount of fluctuation in a rotation speed of the crankshaft in one kind of stroke, out of the at least two kinds of strokes, based on the crank angle signal from the crank angle signal output unit, and a misfire determination unit configured to perform a misfire determination in response to each acquisition of the crankshaft rotation speed fluctuation physical quantity.

6 Claims, 11 Drawing Sheets

(58) Field of Classification Search
CPC . F02D 2200/1015; B62M 7/02; G01M 15/11; F02B 61/02
See application file for complete search history.

(56) References Cited

U.S. PATENT DOCUMENTS

| | | | | |
|---|---|---|---|---|
| 5,775,299 | A * | 7/1998 | Ito | F02D 41/0085 123/406.47 |
| 2008/0189023 | A1* | 8/2008 | Lewis | G01M 15/11 701/102 |
| 2010/0211296 | A1 | 8/2010 | Saunders | |
| 2014/0305390 | A1* | 10/2014 | Forster | F02B 63/04 123/2 |
| 2017/0276083 | A1* | 9/2017 | Saiki | F02D 41/26 |
| 2018/0017004 | A1* | 1/2018 | Horii | F02P 5/152 |
| 2018/0087462 | A1* | 3/2018 | Hotta | F02D 45/00 |
| 2019/0128779 | A1* | 5/2019 | Hotta | F02D 41/1498 |

FOREIGN PATENT DOCUMENTS

| | | | |
|---|---|---|---|
| JP | 2006152971 A | 6/2006 |
| JP | 2009293501 A | 12/2009 |
| JP | 2012077700 A | 4/2012 |
| JP | 2016070255 A | 5/2016 |

* cited by examiner

STRADDLED VEHICLE ENGINE UNIT AND STRADDLED VEHICLE

CROSS-REFERENCE TO RELATED APPLICATIONS

This is a continuation-in-part application of International Application PCT/JP2020/006043 filed on Feb. 17, 2020, which claims priority from a Japanese Patent Application No. 2019-045539, filed on Mar. 13, 2019. The contents of the applications are incorporated herein by reference.

TECHNICAL FIELD

The present teaching relates to a straddled vehicle engine unit and a straddled vehicle.

BACKGROUND ART

A straddled vehicle engine unit, which includes an internal combustion engine and various devices, is mounted to a straddled vehicle. For example, Patent Literature 1 (PTL 1) shows a misfire determination device for determining a misfire in an engine that is mounted to a motorcycle.

The misfire determination device according to PTL 1 is capable of determining the presence or absence of a misfire in the engine, by detecting a change in a physical quantity indicative of the rotation speed of a crankshaft.

CITATION LIST

Patent Literature

PTL 1: Japanese Patent Application Laid-Open No. 2016-70255

SUMMARY OF INVENTION

Technical Problem

Detecting a misfire in an internal combustion engine mounted to a straddled vehicle by using a change in a physical quantity indicative of the rotation speed of a crankshaft may sometimes have a low detection accuracy.

The present teaching aims to provide a straddled vehicle engine unit and a straddled vehicle, capable of detecting a misfire in an internal combustion engine mounted to the straddled vehicle with high accuracy.

Solution to Problem

The inventors of the present application conducted studies, aiming to detect a misfire in a straddled vehicle engine unit with high accuracy. The inventors consequently found out the following.

An internal combustion engine mounted to a straddled vehicle is required to be capable of operating at a higher rotation speed than an internal combustion engine mounted to a four-wheeled vehicle, for example. This is why an internal combustion engine of a straddled vehicle engine unit is normally configured to have a lower moment of inertia than an internal combustion engine mounted to a four-wheeled vehicle, for example. With such a configuration, the rotation speed easily changes even in a normal situation having no misfire. In the internal combustion engine provided in the straddled vehicle, therefore, there is sometimes difficulty in making determination based on a differential between a rotation fluctuation in a misfire situation and a rotation fluctuation in a normal situation.

An exhaust valve and an intake valve of the internal combustion engine mounted to the straddled vehicle are opened for a longer period than those of an internal combustion engine mounted to a four-wheeled vehicle for example, because of the need to be capable of operating at a higher rotation speed than the internal combustion engine mounted to the four-wheeled vehicle for example. Thus, a period of valve overlap, in which the exhaust valve and the intake valve are opened simultaneously, is long. This makes it likely that an exhaust gas in an exhaust passage is brought, as if returning, into a combustion chamber due to a negative pressure of intake air. Consequently, mixing of internal residual gases is likely to occur. The larger the amount of exhaust gas contained in the combustion chamber is, the lower the gas combustion speed in the combustion chamber is. This is why the internal combustion engine mounted to the straddled vehicle has a prolonged combustion period. As the combustion period is long, a variation of the combustion period is large accordingly. Thus, the rotation speed easily changes even in a normal situation. In the internal combustion engine provided in the straddled vehicle, therefore, there is sometimes difficulty in making determination based on a differential between a rotation fluctuation in a misfire situation and a rotation fluctuation in a normal situation.

The inventors of the present application conducted further studies on a rotation fluctuation in the straddled vehicle engine unit.

The internal combustion engine provided in the straddled vehicle has a low moment of inertia. In the internal combustion engine provided in the straddled vehicle, therefore, the rotation speed is highly responsive to a manipulation or disturbance. Thus, in the internal combustion engine provided in the straddled vehicle, the rotation speed is highly responsive to a misfire, too. When each of timings at which a specific kind of stroke such as the combustion stroke comes is taken as a point of reference, the rotation speed is lowered at one of the timings due to an influence of a misfire, and the lowering of the rotation speed due to the misfire is completed at a next one of the timings.

These findings led the inventors to discover that it is possible to detect a misfire in the engine mounted to the straddled vehicle with high accuracy, by detecting lowering of the rotation speed at one timing and completion of the lowering of the rotation speed at next timing.

The inventors discovered that it is possible to increase the accuracy of detection of a misfire by taking advantage of the engine's characteristic, the low moment of inertia, which has been considered as a factor that makes improvement of a misfire determination accuracy difficult in the straddled vehicle engine unit.

To attain the aim, an aspect of the present teaching provides a straddled vehicle engine unit having the following configurations.

(1) A straddled vehicle engine unit mounted to a straddled vehicle includes:

an internal combustion engine including a crankshaft and a crank angle signal output unit that periodically outputs a crank angle signal in accordance with rotation of the crankshaft, the internal combustion engine being configured to repeat two or more kinds of strokes on a cycle of every 720-degree rotation of the crankshaft; and a misfire detection device including a crankshaft rotation speed fluctuation physical quantity acquisition unit and a misfire determination unit, the crankshaft rotation speed fluctuation physical quantity acquisition unit being configured to acquire a physical quantity related to the amount of fluctuation in the rotation speed of the crankshaft in a specific kind of stroke out of the two or more kinds of strokes, based on a signal from the crank angle signal output unit, the misfire determination unit being configured to perform a misfire determination in response to each acquisition of the crankshaft rotation speed fluctuation physical quantity, whereby the misfire determination unit determines that a misfire has occurred in the internal combustion engine upon detecting both lowering of the rotation speed of the crankshaft at a first preceding timing based on a differential between a first preceding physical quantity and a second preceding physical quantity, the first preceding timing corresponding to the specific kind of stroke before an acquisition timing at which the crankshaft rotation speed fluctuation physical quantity is acquired, the first preceding physical quantity being a physical quantity acquired at the first preceding timing, the second preceding physical quantity being a physical quantity acquired at a second preceding timing corresponding to the specific kind of stroke before the first preceding timing, and completion of the lowering of the rotation speed at the acquisition timing based on a differential between the crankshaft rotation speed fluctuation physical quantity and the first preceding physical quantity.

The straddled vehicle engine unit configured as above includes the internal combustion engine and the misfire detection device. The straddled vehicle engine unit is mounted to a straddled vehicle. Thus, the internal combustion engine is mounted to the straddled vehicle. The internal combustion engine includes the crankshaft and the crank angle signal output unit. The crank angle signal output unit periodically outputs a crank angle signal in accordance with rotation of the crankshaft.

The misfire detection device includes the crankshaft rotation speed fluctuation physical quantity acquisition unit and the misfire determination unit. The crankshaft rotation speed fluctuation physical quantity acquisition unit acquires a crankshaft rotation speed fluctuation physical quantity based on a signal from the crank angle signal output unit. The crankshaft rotation speed fluctuation physical quantity is a physical quantity related to the amount of fluctuation in the rotation speed of the crankshaft in a specific kind of stroke out of the two or more kinds of strokes.

The misfire determination unit determines a misfire state in response to each acquisition of the crankshaft rotation speed fluctuation physical quantity. Upon detecting both lowering of the rotation speed of the crankshaft at the first preceding timing and completion of the lowering of the rotation speed at the acquisition timing, the misfire determination unit determines that a misfire has occurred. The first preceding timing is a timing before the acquisition timing at which the crankshaft rotation speed fluctuation physical quantity is acquired. Both the first preceding timing and the second preceding timing correspond to the specific kind of stroke. The second preceding timing is a timing before the first preceding timing.

The lowering of the rotation speed of the crankshaft at the first preceding timing is detected based on the differential between the first preceding physical quantity acquired at the first preceding timing and the second preceding physical quantity acquired at the second preceding timing. The completion of the lowering of the rotation speed at the acquisition timing is detected based on the differential between the crankshaft rotation speed fluctuation physical quantity and the first preceding physical quantity.

The amount of fluctuation in the rotation speed of the crankshaft when the internal combustion engine of the straddled vehicle engine unit is in a normal situation is greater as compared to an internal combustion engine of a four-wheeled vehicle, for example. The crankshaft rotation speed fluctuation physical quantity is large. The internal combustion engine of the straddled vehicle engine unit has a low moment of inertia, and therefore its rotation speed is highly responsive to a misfire. Thus, lowering of the rotation speed caused by a misfire is likely to be completed at a next one of timings corresponding to the specific kind of stroke.

In the above-described configuration, it is determined that a misfire has occurred in the internal combustion engine, upon detection of both lowering of the rotation speed of the crankshaft at the first preceding timing before the acquisition timing at which the crankshaft rotation speed fluctuation physical quantity is acquired and completion of the lowering of the rotation speed at the acquisition timing. Accordingly, by taking advantage of the low moment of inertia, which is characteristic of the internal combustion engine of the straddled vehicle engine unit, a misfire in the internal combustion engine of the straddled vehicle engine unit can be determined with high accuracy.

In an aspect of the present teaching, the straddled vehicle engine unit can adopt the following configuration.

(2) The straddled vehicle engine unit according to (1) is configured such that the internal combustion engine includes two or more cylinders, and in response to each acquisition of the crankshaft rotation speed fluctuation physical quantity, the misfire determination unit determines the presence of a misfire in the internal combustion engine upon detecting both lowering of the rotation speed of the crankshaft at a first preceding timing based on a differential between a first preceding physical quantity and a second preceding physical quantity, the first preceding timing corresponding to the specific kind of stroke that is 720 crank angle degrees before an acquisition timing at which the crankshaft rotation speed fluctuation physical quantity is acquired, the first preceding physical quantity being acquired at the first preceding timing, the second preceding physical quantity being acquired at a second preceding timing corresponding to the specific kind of stroke that is 720 crank angle degrees before the first preceding timing, and completion of the lowering of the rotation speed based on a differential between the first preceding physical quantity and the crankshaft rotation speed fluctuation physical quantity.

In the above-described configuration, the internal combustion engine includes two or more cylinders. On a cycle of every 720 crank angle degrees, the same kind of stroke is performed in the same cylinder. In the above-described configuration, a misfire determination is performed based on a differential between crankshaft rotation speed fluctuation physical quantities that are obtained respectively in two strokes of the same kind performed in the same cylinder. This can suppress an error in the determination, which may otherwise be caused by a variation of cylinders. In an internal combustion engine including two or more cylinders, during a period from when a cylinder undergoes one stroke of a certain kind to when the same cylinder undergoes another stroke of the same kind, the other cylinders undergo kinds of strokes including the combustion stroke. When the same kind of strokes are performed in the same cylinder, therefore, lowering of the rotation speed caused by a misfire is firstly detected at the first preceding timing, and then at the acquisition timing in a next one of the same kind of strokes in the cylinder, the lowering of the rotation speed is likely to be completed more reliably. Accordingly, by taking advantage of the low moment of inertia, which is characteristic of the internal combustion engine of the straddled vehicle engine unit, a misfire can be determined with higher accuracy.

In an aspect of the present teaching, the straddled vehicle engine unit can adopt the following configuration.

(3) The straddled vehicle engine unit according to (1) or (2) is configured such that the crankshaft rotation speed fluctuation physical quantity acquisition unit acquires, as the physical quantity related to the amount of fluctuation in the rotation speed of the crankshaft in the specific kind of stroke, a quantity that represents a differential between a rotation speed at a first crank angle position in the specific kind of stroke and a rotation speed at a second crank angle position that is less than 720 crank angle degrees before the first crank angle position.

In the above-described configuration, the quantity representing the differential between the rotation speed at the first crank angle position and the rotation speed at the second crank angle position is acquired as the physical quantity related to the amount of fluctuation in the rotation speed of the crankshaft. The misfire determination unit consequently detects lowering of the rotation speed of the crankshaft at the first preceding timing, based on a differential between the speed differential acquired at the first preceding timing and the speed differential acquired at the second preceding timing. The misfire determination unit also detects completion of the lowering of the rotation speed, based on a differential between the speed differential acquired at the acquisition timing and the speed differential acquired at the first preceding timing.

Since the detection is based on a differential between differentials, for example, a gradual fluctuation in the rotation speed accompanying acceleration or deceleration of the straddled vehicle is less influential. Accordingly, a misfire in the internal combustion engine of the straddled vehicle engine unit can be determined with high accuracy.

In an aspect of the present teaching, the straddled vehicle engine unit can adopt the following configuration.

(4) The straddled vehicle engine unit according to (3) is configured such that the misfire determination unit determines that a misfire has occurred in the internal combustion engine if positive or negative polarity of a differential of the crankshaft rotation speed fluctuation physical quantity from the first preceding physical quantity is opposite to positive or negative polarity of a differential of the first preceding physical quantity from the second preceding physical quantity.

In the above-described configuration, a determination that a misfire has occurred can be made by identifying whether a value obtained by detection based on a differential between differentials has positive polarity or negative polarity. Accordingly, with a simple configuration, a misfire in the internal combustion engine of the straddled vehicle engine unit can be determined with high accuracy In an aspect of the present teaching, a straddled vehicle can adopt the following configuration.

(5) A straddled vehicle includes:

the straddled vehicle engine unit according to any of (1) to (4); and a wheel that is driven by the internal combustion engine.

The above-described configuration allows a misfire in the internal combustion engine provided in the straddled vehicle to be determined with high accuracy, by taking advantage of the low moment of inertia, which is characteristic of the internal combustion engine provided in the straddled vehicle.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment and coupling unless otherwise specified. The terms "connected" and "coupled" are not limited to physical or mechanical connection or coupling, and can include direct and indirect electrical connection and coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein.

It will be understood that the description of the present teaching discloses multiple techniques and steps. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims.

Description will give an explanation about a novel straddled vehicle engine unit.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The straddled vehicle engine unit includes the internal combustion engine and the misfire detection device, and is provided in the straddled vehicle. The misfire detection device may be either an ECU which will be described later, or a control device that is provided in the vehicle separately from the ECU, for example. The misfire detection device is capable of communicating with at least the internal combustion engine, for example. The misfire detection device is configured to be capable of receiving a signal outputted from a sensor, etc. included in the internal combustion engine and transmitting a control signal to various apparatuses and/or devices, etc. included in the internal combustion engine, for example. The misfire detection device may further be configured to be capable of receiving a signal outputted from a sensor, etc. included in the vehicle and transmitting a control signal to various apparatuses and/or devices, etc. included in the vehicle, for example. The straddled vehicle engine unit does not always represent a physical unitization of the internal combustion engine and the misfire detection device. In the straddled vehicle engine unit, the internal combustion engine and the misfire detection device may be configured as a physically integrated unit, or may not be configured as a physically integrated unit.

The straddled vehicle includes, for example, a wheel in addition to the straddled vehicle engine unit. The wheel includes a driving wheel that is rotated by receiving power outputted from the internal combustion engine. The number of wheels is not particularly limited. The straddled vehicle refers to a vehicle of a type having a saddle where a rider sits astride. Examples of the straddled vehicle include a motorcycle, a three-wheeled motorcycle, and an all-terrain vehicle (ATV).

The driving wheel of the straddled vehicle is a rear wheel, for example. The driving wheel is not limited to this, and may be a front wheel, for example.

Examples of the internal combustion engine include, but are not particularly limited to, a four-stroke engine. The internal combustion engine may be either a gasoline engine or a diesel engine. The number of cylinders is not particularly limited. Examples of the internal combustion engine include internal combustion engines including various numbers of cylinders, namely, four cylinders, six cylinders, eight cylinders, and the like. The internal combustion engine may be an internal combustion engine including a single cylinder, two cylinders, or three cylinders. A multi-cylinder internal combustion engine may be either of equal interval combustion type or of unequal interval combustion type.

The crank angle signal output unit is not particularly limited, and a conventionally known apparatus can be adopted as the crank angle signal output unit. Examples of the crank angle signal output unit include a resolver, a Hall IC, an electromagnetic induction type sensor, and the like. For example, the crank angle signal output unit outputs a crank angle signal indicating passing of any of detection object portions that are disposed on the crankshaft and arranged at intervals corresponding to a predetermined detection angle. The crank angle signal output unit periodically outputs a crank angle signal in relation to rotation of the crankshaft. It however is not always necessary that the crank angle signal output unit is configured to output a crank angle signal on a constant cycle all the time while the crankshaft is rotating at a constant speed, for example. Apart of the detection object portions may be arranged at an interval different from the intervals at which the rest of the detection object portions are arranged, for example. Consequently, in a partial crankshaft rotation angle region, the crank angle signal output unit may output a signal on a different cycle as compared to the other regions, for example.

A hardware configuration of the misfire detection device is not particularly limited. The misfire detection device may be constituted of a computer including a central processing unit and a storage device. The misfire detection device may be partially or entirely constituted of a wired logic, which is an electronic circuit. The misfire detection device as a whole may be physically configured as a single piece, or may be physically configured by a combination of a plurality of different devices.

The crankshaft rotation speed fluctuation physical quantity acquisition unit acquires a physical quantity related to the amount of fluctuation in the rotation speed of the crankshaft in a specific kind of stroke. It is only required that the specific kind of stroke is any one of the intake stroke, the compression stroke, the combustion stroke, and the exhaust stroke included in the internal combustion engine, for example. A timing corresponding to the specific kind of stroke is a timing within a range of the specific kind of stroke. In a case of the internal combustion engine including two or more cylinders, a timing corresponding to another stroke of the specific kind before the timing corresponding to the specific kind of stroke may be a timing corresponding to the same kind of stroke in the same cylinder, or may be a timing corresponding to the same kind of stroke in another cylinder. The crankshaft rotation speed fluctuation physical quantity is a physical quantity related to the amount of fluctuation in the rotation speed of the crankshaft. A timing at which the crankshaft rotation speed fluctuation physical quantity acquisition unit acquires a physical quantity may be different from a timing at which the crank angle signal output unit outputs a signal. For example, the crankshaft rotation speed fluctuation physical quantity acquisition unit may acquire a timing physical quantity once, while the crank angle signal output unit outputs a signal two or more times.

The crankshaft rotation speed fluctuation physical quantity is a physical quantity related to the amount of fluctuation in the rotation speed of the crankshaft. The crankshaft rotation speed fluctuation physical quantity may be a value representing the amount of fluctuation in the rotation speed, or may be a value representing the rotation speed. The crankshaft rotation speed fluctuation physical quantity is acquired through continuous acquisition of plural values each representing a rotation speed. For example, the rotation speed of the crankshaft may be an instantaneous rotation speed acquired based on one of time intervals of crank angle signals that are periodically and sequentially outputted from the crank angle signal output unit, or may be an average rotation speed (moving average rotation speed) over a section of a predetermined crank angle (such as 180 CAD or 360 CAD). The crankshaft rotation speed fluctuation physical quantity may be, for example, a differential value between a rotation speed (instantaneous rotation speed or average rotation speed) corresponding to a first crank angle section and a rotation speed (instantaneous rotation speed or average rotation speed) corresponding to a second crank angle section. In this configuration, the first crank angle section is, for example, set so as to at least partially overlap with a section from a compression top dead center of a cylinder that is a misfire detection object to a compression top dead center that comes next in the internal combustion engine. On the other hand, the second crank angle section is, for example, set before the compression top dead center. If a misfire occurs at the compression top dead center, a rotation speed of the crankshaft corresponding to the first crank angle section decreases, but a rotation speed of the crankshaft corresponding to the second crank angle section is not affected by the misfire. Acquisition of the differential value makes it possible to obtain a crankshaft rotation speed fluctuation physical quantity that reflects a differential between the normal situation and the misfire situation. It is not always necessary that a rotation speed corresponding to each section is used without any change to acquire a differential value. It may be acceptable that each rotation speed corresponding to each section is subjected to a computation or correction process, and based on each rotation speed obtained as a result of the process, a differential value is acquired. The crankshaft rotation speed fluctuation physical quantity may be a crankshaft rotation speed fluctuation physical quantity for an equal interval explosion engine, or may be a crankshaft rotation speed fluctuation physical quantity for an unequal interval explosion engine. The crankshaft rotation speed fluctuation physical quantity may be, for example, a rotation speed of a rotator (such as a gear, a shaft, or the like) in a power transfer path extending from the crankshaft to the wheel.

The term "preceding" means being earlier in terms of time. For instance, a preceding timing before the acquisition timing is a timing earlier than the acquisition timing in terms of time.

The misfire detection device detects lowering of the rotation speed of the crankshaft at the first preceding timing, based on the differential between the first preceding physical quantity and the second preceding physical quantity. The misfire detection device detects lowering of the rotation speed in accordance with a result of comparing the differential between the first preceding physical quantity and the second preceding physical quantity against a reference value, for example. The misfire detection device is not limited to this, and for example, may detect lowering of the rotation speed in accordance with the ratio of a differential obtained at a further preceding timing to the differential between the first preceding physical quantity and the second preceding physical quantity.

Completion of lowering of the rotation speed is effected when upon the lowering (decrease) of the rotation speed passing its peak in transition over time. When lowering of the rotation speed is completed, for example, a derivative value turns positive. Transition of the rotation speed includes lowering, rising, and maintaining. Completion of lowering of the rotation speed means rising or maintaining of the rotation speed.

The misfire detection device detects completion of lowering of the rotation speed at the acquisition timing, based on the differential between the crankshaft rotation speed fluctuation physical quantity and the first preceding physical quantity. The misfire detection device detects completion of lowering of the rotation speed in accordance with a result of comparing the differential between the crankshaft rotation speed fluctuation physical quantity and the first preceding physical quantity against a reference value, for example. The misfire detection device is not limited to this, and may detect lowering of the rotation speed in accordance with the ratio of a differential obtained at a further preceding timing to the differential between the crankshaft rotation speed fluctuation physical quantity and the first preceding physical quantity.

The misfire determination unit, for example, determines whether or not a differential between rotation speed fluctuation physical quantities falls within a misfire pattern range including at least first and second reference ranges. For example, the misfire determination part determines that a misfire has occurred, on conditions that the differential of the rotation speed fluctuation physical quantity from the first preceding physical quantity is within the first reference range and that the differential of the first preceding physical quantity from the second preceding physical quantity is within the second reference range. Here, the first reference range and the second reference range are disposed to have opposite polarities.

The misfire determination unit is not limited to this, and for example, may determine whether or not a fluctuation in increase/decrease of the differential between rotation speed fluctuation physical quantities corresponds to a predetermined pattern.

For example, upon determining that a rotation speed fluctuation physical quantity is greater than a predetermined physical quantity determination reference, the misfire determination unit determines whether or not the rotation speed fluctuation physical quantity corresponds to a rotation speed fluctuation physical quantity differential. The misfire determination unit is not limited to this, however. The misfire determination unit, for example, may perform a determination about a rotation speed fluctuation physical quantity differential, even when a rotation speed fluctuation physical quantity is not determined as being greater than the physical quantity determination reference.

Advantageous Effects of Invention

The present teaching can provide a straddled vehicle engine unit and a straddled vehicle, capable of detecting a misfire in an internal combustion engine mounted to the straddled vehicle with high accuracy.

DESCRIPTION OF EMBODIMENTS

Figure 1:
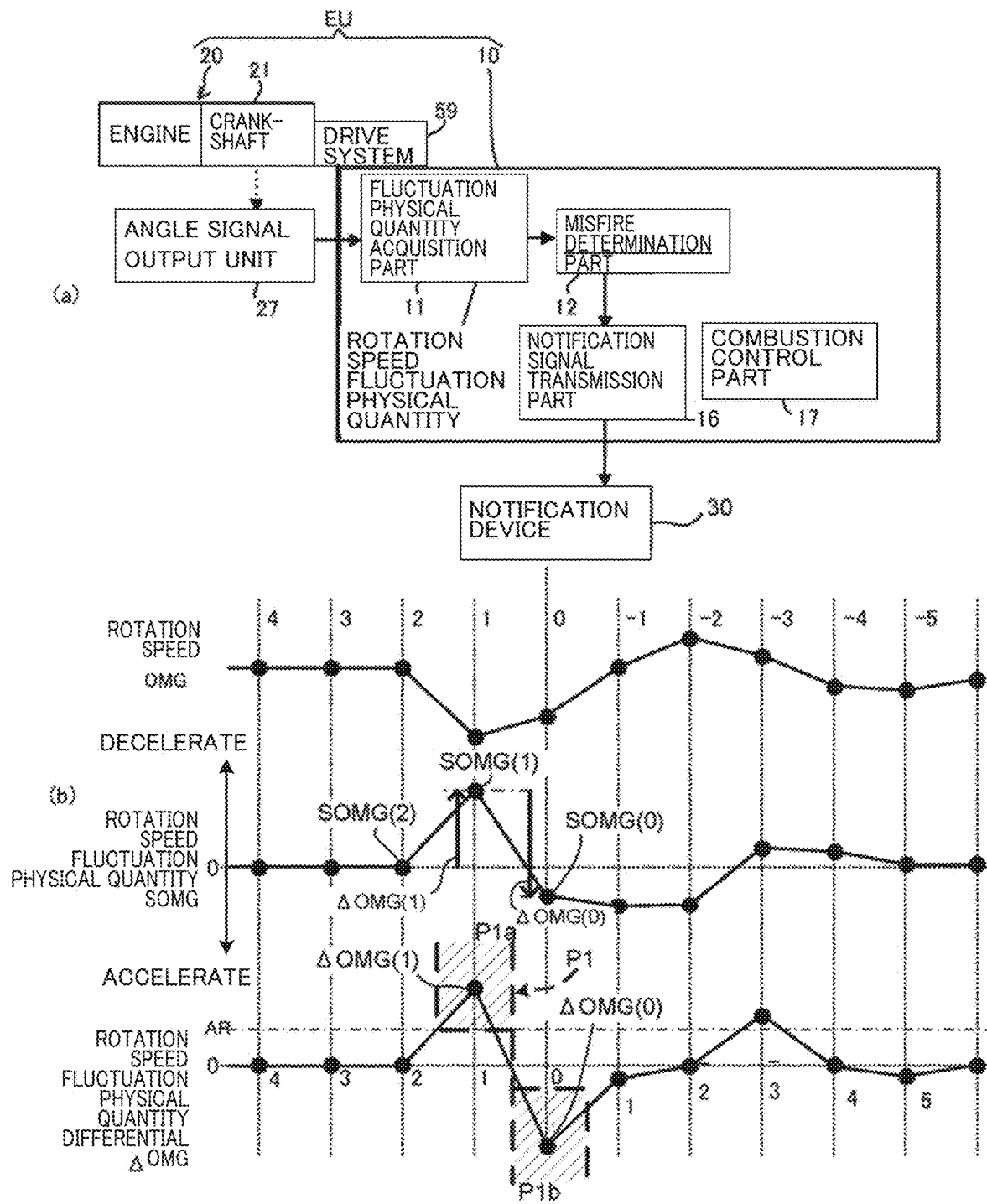
FIG. 1 A diagram outlining a straddled vehicle engine unit according to a first embodiment of the present teaching, and a diagram illustrating a rotation speed fluctuation physical quantity distribution FIG. 2 A view showing an external appearance of a straddled vehicle equipped with the straddled vehicle engine unit shown in FIG. 1

FIG. 1 is a diagram outlining a straddled vehicle engine unit according to a first embodiment of the present teaching, and a diagram illustrating a rotation speed fluctuation physical quantity distribution.

A straddled vehicle engine unit EU includes an engine 20 and a misfire detection device 10. The straddled vehicle engine unit is provided in a straddled vehicle 50 (see FIG. 2). That is, the engine 20 is provided in the straddled vehicle 50.

The engine 20 is an internal combustion engine. The engine 20 has a crankshaft 21 and a crank angle signal output unit 27 (hereinafter, also referred to as the angle signal output unit 27). Power of the engine 20 is outputted via the crankshaft 21. The angle signal output unit 27 periodically outputs a crank angle signal in accordance with rotation of the crankshaft 21.

The misfire detection device 10 detects a misfire in the engine 20. The misfire detection device 10 also functions as a rough road detection device for detecting whether or not the straddled vehicle 50 is traveling on a rough road. The misfire detection device 10 controls the engine 20.

The misfire detection device 10 includes a crankshaft rotation speed fluctuation physical quantity acquisition part 11 (hereinafter, also referred to as the fluctuation physical quantity acquisition part 11) and a misfire determination part 12. The misfire detection device 10 further includes a notification signal transmission part 16 and a combustion control part 17.

The fluctuation physical quantity acquisition part 11 is an example of the crankshaft rotation speed fluctuation physical quantity acquisition unit. The misfire determination part 12 is an example of the misfire determination unit.

The fluctuation physical quantity acquisition part 11 acquires a crankshaft rotation speed fluctuation physical quantity (hereinafter, also referred to as a rotation speed fluctuation physical quantity) in relation to the crankshaft rotation speed fluctuation physical quantity, based on a signal from the angle signal output unit 27. The rotation speed fluctuation physical quantity is a physical quantity related to the amount of fluctuation in the rotation speed of the crankshaft 21 in a specific kind of stroke out of two or more kinds of strokes of the engine 20.

The misfire determination part 12 determines whether or not a misfire has occurred in the engine 20. Each time a rotation speed fluctuation physical quantity is acquired, the misfire determination part 12 determines whether or not a misfire has occurred based on the rotation speed fluctuation physical quantity.

The notification signal transmission part 16 notifies a result of the determination made by the misfire determination part 12. If the misfire determination part 12 determines the presence of a misfire, the notification signal transmission part 16 causes a notification device 30 (see FIG. 3) to display the presence of a misfire. The notification signal transmission part 16 also causes the notification device 30 to display information on the misfire.

If the misfire determination part 12 detects a misfire, the notification signal transmission part 16 outputs misfire information to the notification device 30, the misfire information indicating a result of the misfire detection. The notification signal transmission part 16 outputs information stored therein, when a diagnosis device serving as the notification device 30 becomes or is connected to the misfire detection device 10.

To be specific, the misfire determination part 12 detects lowering of the rotation speed and completion of the lowering, by using a first preceding physical quantity and a second preceding physical quantity. The first preceding physical quantity is a rotation speed fluctuation physical quantity that is acquired at a first preceding timing, which is a timing before a timing when a rotation speed fluctuation physical quantity is acquired. The second preceding physical quantity is a rotation speed fluctuation physical quantity that is acquired at a second preceding timing, which is a timing before the first preceding timing. The misfire determination part 12 determines that a misfire has occurred, upon detecting both lowering of the rotation speed of the crankshaft 21 at the first preceding timing and completion of the lowering of the rotation speed at the acquisition timing.

Shown in the part (b) of FIG. 1 are a rotation speed OMG, a rotation speed fluctuation physical quantity SOMG, and a differential $\Delta$OMG obtained based on the rotation speed fluctuation physical quantity SOMG, in a case of a misfire occurring at a timing (position) immediately before "1". The horizontal axis represents the rotation angle of the crankshaft 21. A crank angle position of a detection object at a certain time point is numbered "0". Starting from the position "0" retrospectively, every crank angle at which a specific kind of stroke comes is numbered "1", "2", "3", . . . .

For example, at the timing "0", a rotation speed fluctuation physical quantity SOMG(0) is acquired as a fluctuation amount, based on a differential between a rotation speed of the engine 20 at the timing "0" and a rotation speed of the engine 20 at the timing "1", which is included in the previous stroke of the same kind as the stroke including the timing "0". In response to the acquisition of the rotation speed fluctuation physical quantity SOMG(0), the misfire determination part 12 detects lowering of the rotation speed of the crankshaft at the first preceding timing ("1") based on a differential $\Delta$OMG(1) between a first preceding physical quantity SOMG(1) and a second preceding physical quantity SOMG(2). The first preceding timing ("1") is a timing corresponding to an intake stroke previous to the acquisition timing ("0") at which the rotation speed fluctuation physical quantity SOMG(0) is acquired. The first preceding physical quantity SOMG(1) is a rotation speed fluctuation physical quantity that is acquired at the first preceding timing ("1"). The second preceding physical quantity SOMG(2) is a rotation speed fluctuation physical quantity that is acquired at the second preceding timing ("2"), which corresponds to an intake stroke previous to the first preceding timing ("1").

The misfire determination part 12 further detects completion of lowering of the rotation speed at the acquisition timing ("0"), based on a differential $\Delta$OMG(0) between the rotation speed fluctuation physical quantity SOMG(0) and the first preceding physical quantity SOMG(1).

The part (b) of FIG. 1 also indicates, in its lowermost section, a misfire pattern range P1, which the misfire determination part 12 applies to a misfire determination. The misfire pattern range P1 includes two reference ranges P1$a$, P1$b$. The misfire determination part 12 determines that a misfire has occurred, on conditions that the differential $\Delta$OMG(1) of the rotation speed fluctuation physical quantity SOMG(0) from the first preceding physical quantity SOMG(1) is within the first reference range P1$a$ and that the differential $\Delta$OMG(0) of the first preceding physical quantity SOMG(1) from the second preceding physical quantity SOMG(2) is within the second reference range P1$b$. The first reference range P1$a$ and the second reference range P1$b$ are disposed to have opposite polarities.

In the exemplary rotation speed fluctuation physical quantity SOMG shown in the part (b) of FIG. 1, at the timing of "0", the differential $\Delta$OMG(1) is in the first reference range P1$a$. The differential $\Delta$OMG(0) is in the second reference range P1$b$.

The engine 20 provided in the straddled vehicle 50 (see FIG. 2) has a low moment of inertia, and therefore lowering of the rotation speed OMG caused by a misfire is likely to be completed at a next one of timings corresponding to a specific kind of stroke.

The misfire determination part 12 detects lowering of the rotation speed OMG of the crankshaft 21 at the first preceding timing, and also detects completion of the lowering of the rotation speed OMG at the acquisition timing, and thus can determine occurrence of a misfire in the engine 20 with high accuracy. The misfire determination part 12 is able to determine a misfire in the engine 20 provided in the straddled vehicle 50 with high accuracy, by taking advantage of the characteristic of the engine 20 having the low moment of inertia.

Figure 2:
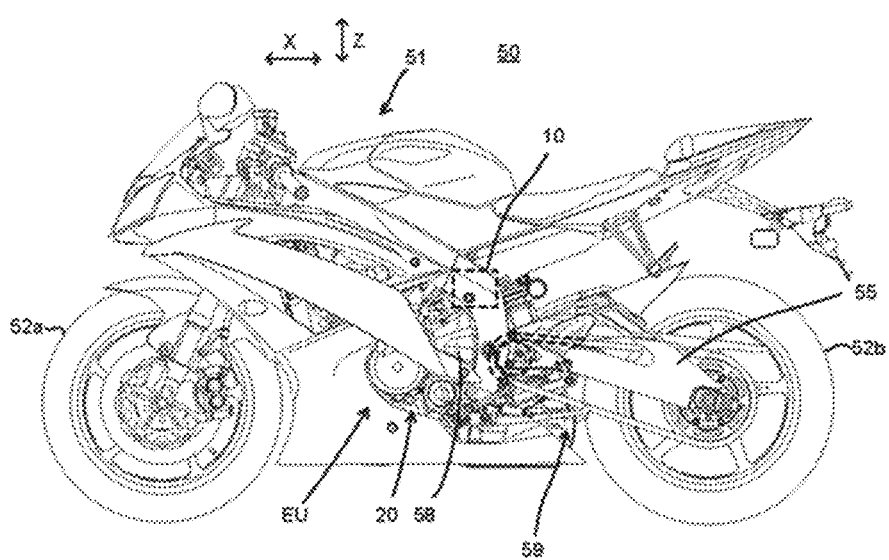

FIG. 2 is a view showing an external appearance of the straddled vehicle equipped with the straddled vehicle engine unit shown in FIG. 1.

The straddled vehicle 50 shown in FIG. 2 includes a vehicle body 51 and wheels 52a, 52b. The wheels 52a, 52b are supported by the vehicle body 51. The straddled vehicle 50 is a motorcycle with two wheels 52a, 52b. The wheels 52a, 52b provided to the vehicle body 51 of the straddled vehicle 50 are disposed one behind the other in a front-rear direction X of the straddled vehicle 50. The rear wheel 52b is a driving wheel.

The straddled vehicle 50 includes the straddled vehicle engine unit EU and a drive system 59. The straddled vehicle engine unit EU includes the misfire detection device 10 and the engine 20. The drive system 59 drives the straddled vehicle 50 by transmitting power of the engine 20.

Figure 3:
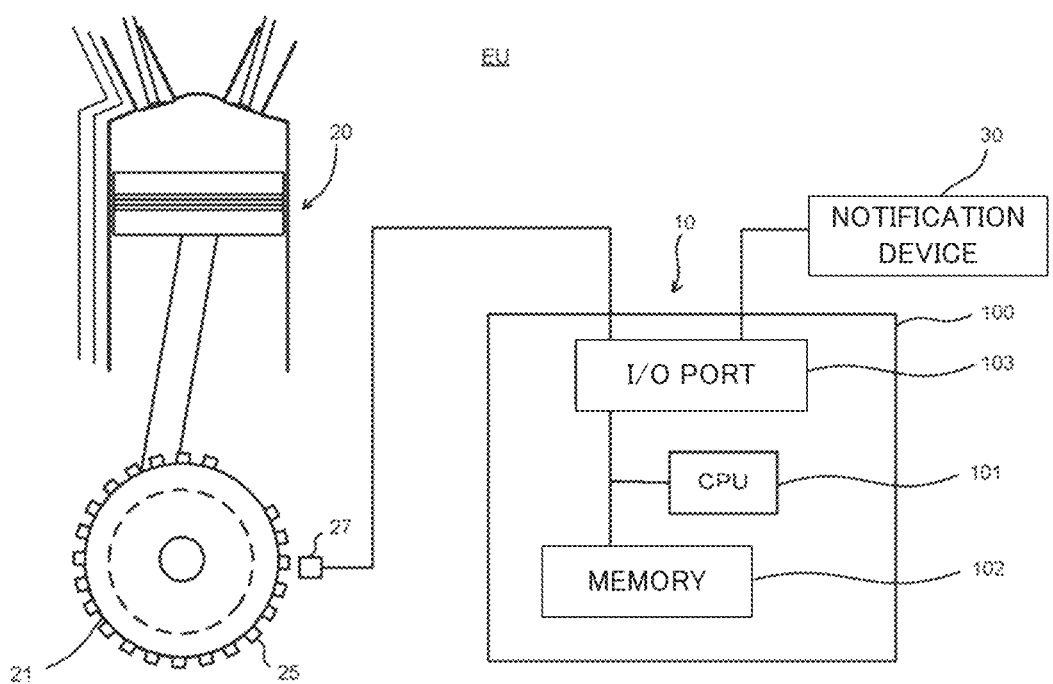
FIG. 3 A configuration diagram schematically showing configurations of a misfire detection device shown in FIG. 1 as well as peripheral devices thereof FIG. 4 A chart showing an exemplary rotation speed of a crankshaft FIG. 5 Charts showing an exemplary rotation speed and an exemplary rotation speed fluctuation physical quantity FIG. 6 A diagram illustrating rotation speed fluctuation physical quantity distributions in relation to an engine FIG. 7 A flowchart showing operations of the misfire detection device shown in FIG. 1

FIG. 3 is a configuration diagram schematically showing configurations of the misfire detection device shown in FIG. 1 as well as peripheral devices thereof.

The misfire detection device 10 shown in FIG. 3 is a device related to the engine 20. The engine 20 according to this embodiment is a three-cylinder engine.

The engine 20 includes the crankshaft 21. The crankshaft 21 rotates in accordance with operations of the engine 20. The crankshaft 21 has two or more detection object portions 25 for use to detect rotation of the crankshaft 21. The detection object portions 25 are arranged at intervals in the circumferential direction of the crankshaft 21, the intervals corresponding to predetermined detection angles relative to the rotational center of the crankshaft 21. For instance, each of the detection angles is 15 degrees. It however is to be noted that the interval of some adjacent detection object portions 25 is larger than the detection angle mentioned above. The detection object portions 25 move as the crankshaft 21 rotates.

Upon detecting passing of any detection object portion 25, the angle signal output unit 27 outputs a signal. Consequently, the angle signal output unit 27 periodically outputs a crank angle signal (angle signal) in accordance with rotation of the crankshaft 21. For example, when the crankshaft 21 rotates at a fixed speed, the angle signal output unit 27 outputs the angle signal on a fixed cycle according to the detection angle. It however is to be noted that at some rotation angle, the angle signal output unit 27 outputs the angle signal on a cycle longer than the cycle according to the detection angle.

A computer 100 that configures the misfire detection device 10 includes a CPU 101, a memory 102, and an I/O port 103.

The CPU 101 executes a computing process based on a control program. The memory 102 stores the control program and information necessary for computation. The I/O port 103 inputs and outputs signals to and from an external device.

Connected to the I/O port 103 is the angle signal output unit 27. The angle signal output unit 27 outputs the angle signal as the crankshaft 21 of the engine 20 rotates by every detection angle.

Also connected to the I/O port 103 is the notification device 30. The notification device 30 displays information based on a signal outputted from the misfire detection device 10. The notification device 30 is, for example, a display lamp provided to the straddled vehicle 50. The notification device 30 encompasses a diagnosis device, which is an external device of the straddled vehicle 50, for example.

The misfire detection device 10 according to this embodiment detects a misfire in the engine 20 based on the rotation speed of the crankshaft 21. The misfire detection device 10 according to this embodiment has a function as an engine control unit (ECU) that controls operations of the engine 20, too. An intake air pressure sensor, a fuel injection device, and a spark plug, all of which are not shown, are connected to the misfire detection device 10.

The fluctuation physical quantity acquisition part 11, the misfire determination part 12, the notification signal transmission part 16, the combustion control part 17, the notification signal transmission part 16, and the combustion control part 17 shown in FIG. 1 are implemented by hardware shown in FIG. 3 being controlled by the CPU 101 (see FIG. 3) that executes the control program.

The fluctuation physical quantity acquisition part 11 shown in the part (a) of FIG. 1 acquires a rotation speed fluctuation physical quantity on the crankshaft 21 based on an angle signal received from the angle signal output unit 27. The angle signal is outputted as the crankshaft 21 rotates by every detection angle.

The fluctuation physical quantity acquisition part 11 acquires a rotation speed by measuring a time interval of timings at which the angle signal output unit 27 outputs a signal. The fluctuation physical quantity acquisition part 11 also acquires a rotation speed fluctuation physical quantity. The rotation speed fluctuation physical quantity acquired by the fluctuation physical quantity acquisition part 11 is a rotation speed fluctuation physical quantity of the engine 20.

A fluctuation in the rotation speed of the engine 20 includes a fluctuation attributable to combustion of the engine 20. The fluctuation attributable to combustion of the engine 20 has an angular period equal to or shorter than a crank angle that corresponds to four strokes.

The fluctuation in the rotation speed of the engine 20 may sometimes include not only the fluctuation attributable to combustion of the engine 20 but also a fluctuation attributable to traveling on rough road, for example. Traveling on rough road is an external factor of the engine 20.

The fluctuation physical quantity acquisition part 11, for example, acquires a rotation speed in a section of 180 crank angle degrees corresponding to a combustion stroke of each cylinder and a rotation speed in a section of 180 crank angle degrees corresponding to strokes between combustion strokes.

The fluctuation physical quantity acquisition part 11 calculates the amount of fluctuation in the rotation speed of the engine 20, corresponding to cylinders that successively undergo strokes of the same kind. Based on this amount of fluctuation, the fluctuation physical quantity acquisition part 11 acquires a rotation speed fluctuation physical quantity.

Figure 4:
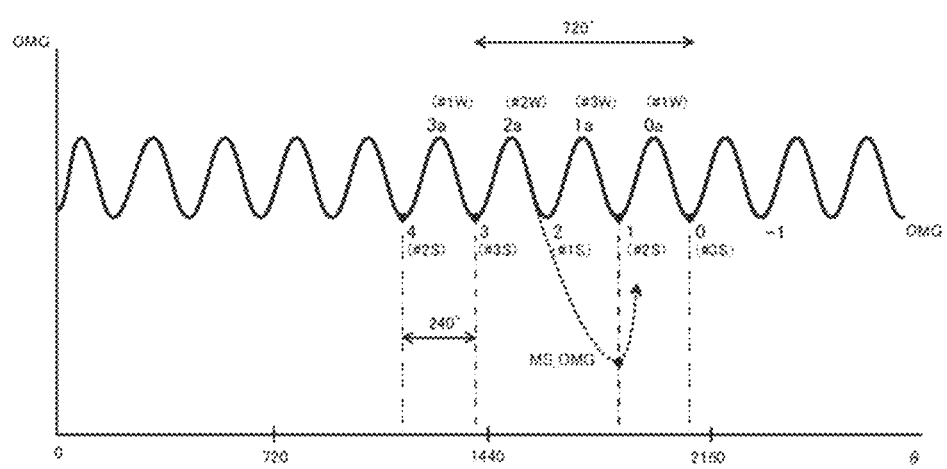

FIG. 4 is a chart showing an exemplary rotation speed of the crankshaft.

In the graph of FIG. 4, the horizontal axis represents the rotation angle θ of the crankshaft 21, and the vertical axis represents the rotation speed. In the example illustrated in FIG. 4, a fluctuation attributable to external factors of the engine 20 is not considered, for ease of understanding the relationship of the rotation speed.

The graph of FIG. 4 outlines a fluctuation in the rotation speed OMG. A graph of the rotation speed OMG is obtained by connecting with a curved line a rotation speed value calculated at a crank angle corresponding to a combustion stroke and a rotation speed value calculated at a crank angle corresponding to an intake stroke.

The graph of FIG. 4 indicates a transition of the rotation speed OMG over the crank angle, instead of a transition of the rotation speed over time.

A rotation fluctuation attributable to the combustion operation has cycle periods in each 720 crank angle degrees. The number of the cycle periods corresponds to the number of cylinders. The engine 20 of this embodiment is a three-cylinder four-stroke engine of equal interval combustion type. The rotation fluctuation in the rotation speed OMG shown in FIG. 4 has three cycle periods in each 720 crank angle degrees. That is, the rotation fluctuation attributable to the combustion operation of the engine 20 has a period shorter than the crank angle (720 degrees) corresponding to four strokes. A peak of the rotation speed corresponding to a compression stroke of the cylinder, appears every 240 crank angle degrees.

In the graph of FIG. 4, a crank angle position serving as a detection object at a certain time point is numbered "0". Starting from the position "0", every 240 crank angle degrees is numbered "1", "2", "3", . . . . Additionally, lettered numbers are given, such as "0a" between "0" and "1", and "1a" between "1" and "2". In the example illustrated in FIG. 4, the intake stroke (#3S) of a third cylinder out of the three cylinders is set as the position "0", which serves as the detection object at the certain time point. The positions "1", "2", and "3" correspond to the intake strokes (#2S, #1S, #3S) of the second, first, and third cylinders, respectively.

Values of the rotation speed OMG at the positions "0", "1", "2", . . . are expressed as OMG0, OMG1, OMG2, . . . . A rotation speed of the crankshaft 21 acquired by the fluctuation physical quantity acquisition part 11 is a rotation speed of the engine 20. Thus, descriptions will be given on the assumption that the rotation speed OMG of the crankshaft 21 is the rotation speed OMG of the engine 20. The positions "0", "1", "2", . . . also serve as timings for acquisition of a rotation speed fluctuation physical quantity. Hereinafter, timings may be occasionally referred to as "0", "1", "2", . . . .

The fluctuation physical quantity acquisition part 11 of this embodiment calculates a differential between rotation speeds corresponding to cylinders that successively undergo strokes of the same kind. As the rotation speeds, the fluctuation physical quantity acquisition part 11 uses rotation speeds OMG of the engine 20. The differential thus calculated serves as a rotation speed fluctuation physical quantity. In this embodiment, a rotation speed fluctuation physical quantity is a differential between two rotation speeds OMG, and is a first-order differential of the rotation speed. The rotation speed fluctuation physical quantity SOMG can be regarded as a first derivative of the rotation speed.

For example, given that the position "0" in FIG. 4 serves as the detection object, the positions "0" and "1" are crank angle positions corresponding to cylinders that successively undergo strokes of the same kind. For example, the position "1" corresponds to the intake stroke (#2S in FIG. 4) of the second cylinder. The position "0" corresponds to the intake stroke (#3S in FIG. 4) of the third cylinder. That is, the intake stroke of the second cylinder and the intake stroke of the third cylinder successively occur at the positions "1" and "0". A rotation speed fluctuation physical quantity at the position "0" is a differential between the rotation speed OMG1 and the rotation speed OMG0.

The differential thus calculated is acquired as a rotation speed fluctuation physical quantity by the fluctuation physical quantity acquisition part 11.

In this manner, the fluctuation physical quantity acquisition part 11 acquires a rotation speed fluctuation physical quantity at a timing corresponding to a specific kind of stroke, the specific kind of stroke being the intake stroke.

In FIG. 4, the broken line MS_OMG indicates a rotation speed fluctuation in a misfire situation. The broken line MS_OMG outlines a rotation speed fluctuation in a misfire situation, in the combustion stroke (#3W) of the third cylinder. If a misfire occurs, a rise in the rotation speed caused by combustion does not occur, so that the rotation speed keeps lowering in a period from the combustion stroke (#2W) of the cylinder before the first cylinder to the combustion stroke (#1W) of the cylinder next to the first cylinder. Thus, the rotation speed OMG0 at the position "0" is lower than that in a normal situation having no misfire.

Figure 5:
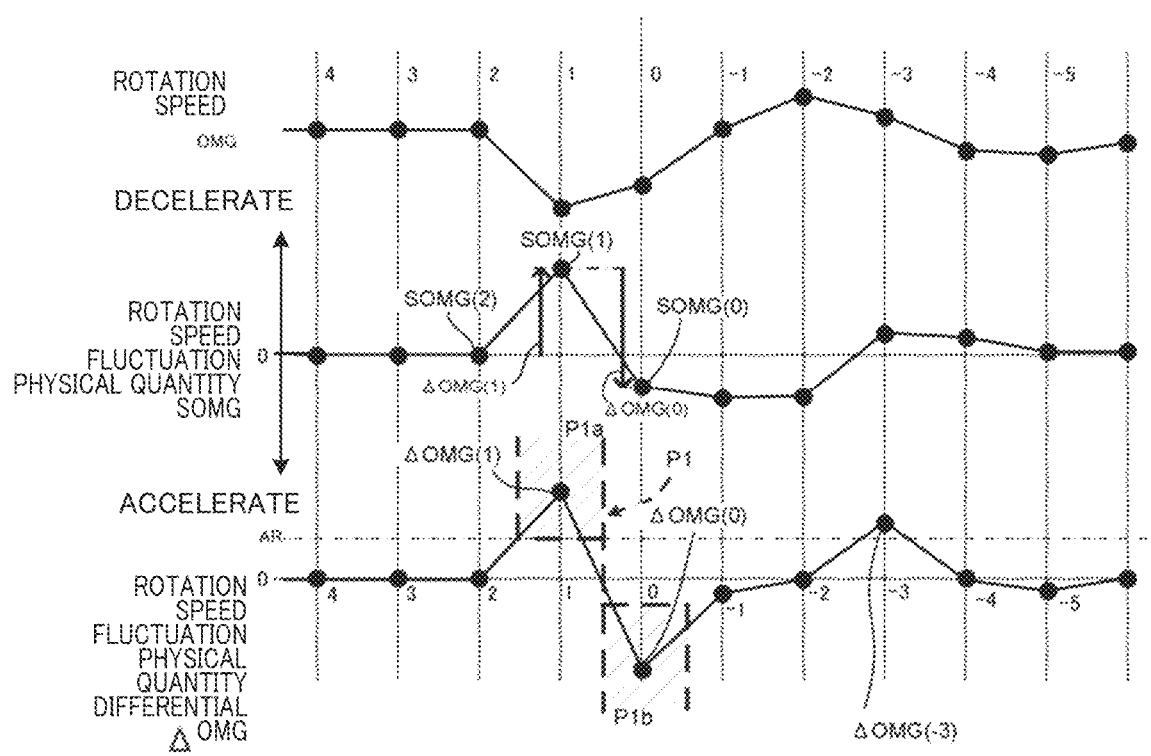

FIG. 5 is charts showing an exemplary rotation speed and an exemplary rotation speed fluctuation physical quantity.

FIG. 5 indicates a rotation speed OMG and a rotation speed fluctuation physical quantity SOMG in a case of a misfire occurring at a timing (position) immediately before "1". FIG. 5 also indicates a differential ΔOMG that is obtained based on the rotation speed fluctuation physical quantity SOMG.

Referring to FIG. 5, a rotation speed fluctuation physical quantity SOMG at a timing in one specific kind of stroke is a differential obtained by subtracting a rotation speed OMG acquired at the timing in the one specific kind of stroke from a rotation speed OMG acquired at a timing in another specific kind of stroke that is previous to the one specific kind of stroke. For instance, a rotation speed fluctuation physical quantity SOMG(0) at the timing "0" is a differential obtained by subtracting a rotation speed OMG(0) at the timing "0" from a rotation speed OMG(1) at the timing "1", which is a timing previous to the timing "0". Accordingly, in the chart of FIG. 5, positive values of the rotation speed fluctuation physical quantity SOMG represent deceleration of the rotation speed OMG. Negative values of the rotation speed fluctuation physical quantity SOMG represent acceleration of the rotation speed.

Each time a rotation speed fluctuation physical quantity SOMG is acquired, the misfire determination part 12 detects lowering of the rotation speed of the crankshaft 21 and completion of the lowering of the rotation speed, based on this rotation speed fluctuation physical quantity and a rotation speed fluctuation physical quantity that has been already acquired at a preceding timing.

In more detail, the misfire determination part 12 detects lowering of the rotation speed of the crankshaft at a first preceding timing, based on a differential between a first preceding physical quantity and a second preceding physical quantity. The first preceding physical quantity is acquired at the first preceding timing, which corresponds to one specific kind of stroke previous to an acquisition timing at which a rotation speed fluctuation physical quantity SOMG is acquired. The second preceding physical quantity is acquired at a second preceding timing, which corresponds to another specific kind of stroke previous to the first preceding timing. The misfire determination part 12 also detects completion of the lowering of the rotation speed at the acquisition timing, based on a differential between the rotation speed fluctuation physical quantity and the first preceding physical quantity. Upon detecting both lowering of the rotation speed of the crankshaft as mentioned above and completion of the lowering of the rotation speed, the misfire determination part 12 determines that a misfire has occurred in the engine 20.

For example, in response to acquisition of the rotation speed fluctuation physical quantity SOMG(0) at the timing "0" in FIG. 5, the misfire determination part 12 detects lowering of the rotation speed of the crankshaft at the first preceding timing ("1") based on a differential ΔOMG(1) between a first preceding physical quantity SOMG(1) and a second preceding physical quantity SOMG(2). The first preceding timing ("1") is a timing corresponding to an intake stroke previous to the acquisition timing ("0") at which the rotation speed fluctuation physical quantity SOMG(0) is acquired. The first preceding physical quantity SOMG(1) is a rotation speed fluctuation physical quantity that is acquired at the first preceding timing ("1"). The second preceding physical quantity SOMG(2) is a rotation speed fluctuation physical quantity that is acquired at the second preceding timing ("2"), which corresponds to an intake stroke previous to the first preceding timing ("1").

The misfire determination part 12 further detects completion of lowering of the rotation speed at the acquisition timing ("0"), based on a differential ΔOMG(0) between the rotation speed fluctuation physical quantity SOMG(0) and the first preceding physical quantity SOMG(1).

FIG. 5 also indicates, in its lowermost chart, a differential ΔOMG in the rotation speed fluctuation physical quantity SOMG acquired at each timing. This chart also indicates a misfire pattern range P1, which the misfire determination part 12 applies to a misfire determination. The misfire pattern range P1 includes two reference ranges P1a, P1b. The first reference range P1a is applied to determination of the differential ΔOMG(1) of the first preceding physical quantity SOMG(1) from the second preceding physical quantity SOMG(2). The second reference range P1b is applied to determination of the differential ΔOMG(0) of the rotation speed fluctuation physical quantity SOMG(0) from the first preceding physical quantity SOMG(1).

The size of the first reference range P1a of the misfire pattern range P1 depends on the value of the differential ΔOMG(1). The upper limit of the second reference range P1b, which corresponds to the differential ΔOMG(0), is calculated by multiplying the value of the differential ΔOMG(1) by a predetermined coefficient.

More specifically, the line indicative of the differential ΔOMG=0 extends between the two reference ranges P1a, P1b. That is, the two reference ranges P1a, P1b included in the misfire pattern range P1 are disposed to have opposite polarities.

The misfire determination part 12 determines that a misfire has occurred, on conditions that the differential ΔOMG (1) of the rotation speed fluctuation physical quantity SOMG (0) from the first preceding physical quantity SOMG(1) is within the first reference range P1a and that the differential ΔOMG(0) of the first preceding physical quantity SOMG(1) from the second preceding physical quantity SOMG(2) is within the second reference range P1b, and the first reference range P1 and the second reference range P1ba are disposed to have opposite polarities.

In the exemplary rotation speed fluctuation physical quantity SOMG shown in FIG. 5, at the timing of "0", the differential ΔOMG(1) is in the first reference range P1a. The differential ΔOMG(0) is in the second reference range P1b. The polarity of the differential ΔOMG(1) and the polarity of the differential ΔOMG(0) are opposite to each other.

Therefore, for the rotation speed fluctuation physical quantity SOMG shown in FIG. 5, the misfire determination part 12 determines that a misfire has occurred at the timing "1".

The misfire determination part 12 determines whether or not two or more differentials obtained from the rotation speed fluctuation physical quantity SOMG are within the predetermined misfire pattern range P1. In other words, the misfire determination part 12 determines whether or not each of fluctuations in the rotation speed fluctuation physical quantity SOMG, which are acquired at timings coming one after another, has a portion as indicated in the misfire pattern range P1. In this manner, the misfire determination part 12 determines whether or not lowering of the rotation speed OMG and subsequent completion of the lowering are attributable to a misfire.

Instead of evaluating a combination of differentials ΔOMG(1), ΔOMG(0) as illustrated in this embodiment, for example, evaluating a single differential may be adopted as a detection method for misfire determination. In this case, each time one differential ΔOMG is acquired, the one differential ΔOMG is simply compared against, for example, a reference value AR shown in FIG. 5.

In the exemplary fluctuation in the rotation speed OMG shown in FIG. 5, no misfire is occurring at the timing "−3". The rotation speed, however, is lowered at the timing "−3", because the rotation speed returns to normal after briefly rising on the rebound from the lowering of the rotation speed caused by the misfire at the timing "1". In the case of comparing one differential ΔOMG against the reference value AR, a misfire is erroneously determined because the lowering of the rotation speed at the timing "−3" makes the differential ΔOMG(−3) exceed the reference value AR.

The misfire determination part 12 according to this embodiment determines a misfire by using a combination of two differentials. In other words, a misfire is determined based on a fluctuation pattern between the two differentials ΔOMG(1), ΔOMG(0). A fluctuation pattern between two differentials is used to collectively determine lowering of the rotation speed of the crankshaft and completion of the lowering. The determination by the misfire determination part 12 allows a misfire to be detected with high accuracy, while suppressing the frequency of erroneous detection.

The rotation speed fluctuation physical quantity SOMG is a first-order differential of the rotation speed. The differential ΔOMG, which is obtained from the rotation speed fluctuation physical quantity SOMG, is a second-order differential of the rotation speed. In the second-order differential of the rotation speed, a gradual change in the rotation speed caused by acceleration or deceleration of the straddled vehicle 50 for example is less influential as compared to the first-order differential. This allows a misfire to be detected with high accuracy.

The determination by the misfire determination part 12 according to this embodiment is highly effective when a rotation speed fluctuation physical quantity distribution in a misfire situation is close to or in contact with a rotation speed fluctuation physical quantity distribution in a normal situation. A situation where the rotation speed fluctuation physical quantity distributions are close to or in contact with each other will now be described.

Figure 6:
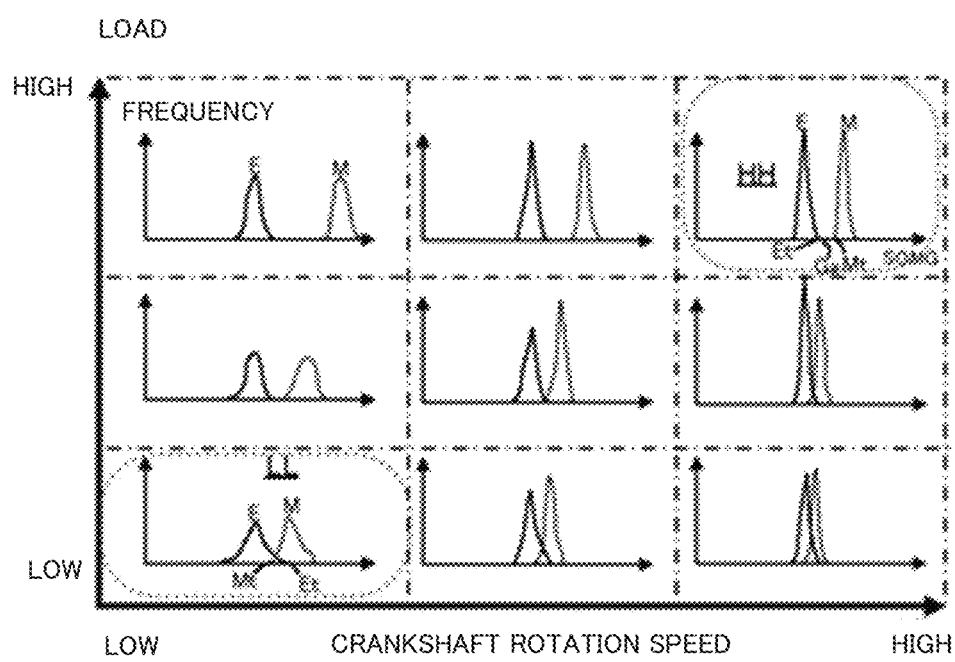

FIG. 6 is a diagram illustrating rotation speed fluctuation physical quantity distributions in relation to the engine.

In FIG. 6, the horizontal axis represents the rotation speed of the crankshaft. The vertical axis represents a load of the engine 20. FIG. 6 shows the entire ranges of rotation speeds and loads that can be outputted by the engine 20.

FIG. 6 indicates three regions into which the range of crankshaft rotation speeds that can be outputted by the engine 20 is equally divided. FIG. 6 also indicates three regions into which the range of loads that can be outputted by the engine 20 is equally divided. Thus, FIG. 6 indicates nine regions that are different from one another in terms of a combination of the magnitude of the crankshaft rotation speed and the magnitude of the load. Of the nine regions, a high load and high rotation speed region HH and a low load and low rotation speed region LL are given by reference signs. For example, the low load and low rotation speed region LL is a low rotation speed region including the lowest crankshaft rotation speed among the three regions into which the range of crankshaft rotation speeds that can be outputted by the engine 20 is equally divided, and at the same time is a region including the lowest load among the three regions into which the range of loads that can be outputted by the internal combustion engine is equally divided.

FIG. 6 shows a rotation speed fluctuation physical quantity distribution typical of each of the nine regions.

The engine 20 is mounted to the straddled vehicle 50 (see FIG. 2), and therefore is configured such that the crankshaft 21 has a reduced moment of inertia. Because of the crankshaft 21 having the reduced moment of inertia, a distribution E and a distribution M are produced in the low load and low rotation speed region LL, the distributions E and M overlapping each other. An operation region of the engine 20 where the distribution E and the distribution M are produced so as to overlap each other will be called an overlap operation region. The low load and low rotation speed region LL is included in the overlap operation region. In the overlap operation region, an interval Ga is not present between a tail Et of the distribution E and a tail Mt of the distribution M. This lowers the misfire detection performance in the low load and low rotation speed region LL. In the low load and low rotation speed region LL, distinction between a rough road traveling state and a misfire is difficult.

In the engine 20, a wide interval Ga is present throughout the high load region including the high load and high rotation speed region HH.

If a sufficient interval is present between the tail Et of the distribution E and the tail Mt of the distribution M as in the high load and high rotation speed region HH for example, the tail Et of the distribution E and the tail Mt of the distribution M remain distant from each other by an interval even when the rotation speed fluctuation physical quantity SOMG increases due to traveling on rough road. It therefore is possible to determine a misfire by determining whether or not a differential in the rotation speed fluctuation physical quantity is greater than the physical quantity determination reference AR.

On the other hand, if the interval Ga is not present between the tail Et of the distribution E and the tail Mt of the distribution M as in the low load and low rotation speed region LL for example, there is a possibility that a crankshaft rotation speed fluctuation physical quantity in a normal situation may be mixed in crankshaft rotation speed fluctuation physical quantities that are determined as being greater than the physical quantity determination reference AR.

While, for example, the straddled vehicle 50 (see FIG. 2) is in the rough road traveling state, an increased number of rotation speed fluctuation physical quantities SOMG may be determined as being greater than the physical quantity determination reference AR though not in the misfire situation. Thus, results of the determinations may contain an erroneous determination.

The misfire detection device 10 according to this embodiment determines both lowering of the rotation speed of the crankshaft attributable to a misfire and completion of the lowering. This allows a misfire to be detected with high accuracy even in an overlap region like the low load and low rotation speed region LL, for example. Since both lowering of the rotation speed of the crankshaft attributable to a misfire and completion of the lowering are determined, a fluctuation attributable to the rough road traveling state can be excluded from detection results with higher accuracy.

Figure 7:
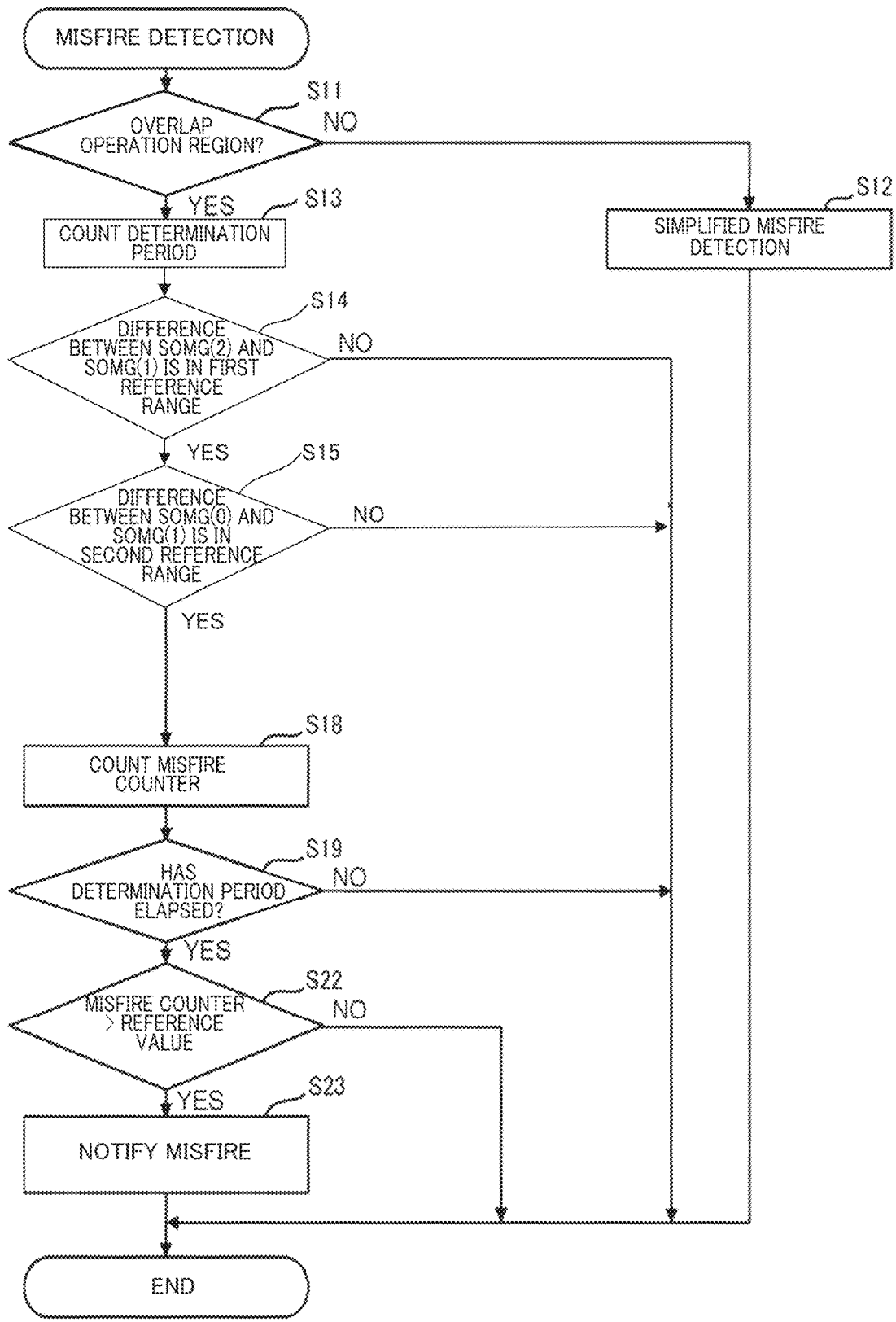

FIG. 7 is a flowchart showing operations of the misfire detection device shown in FIG. 1.

The misfire determination part 12 performs a misfire determination each time a rotation speed fluctuation physical quantity is acquired.

Firstly, the misfire determination part 12 determines whether or not the engine 20 is operating in the overlap operation region (S11).

When, for example, the engine 20 is operating in the high load and high rotation speed region HH, the engine 20 is not operating in the overlap operation region. In this case (No in S11), the misfire determination part 12 performs a simplified misfire detection (S12). In the simplified misfire detection, whether or not each one of differentials in the rotation speed fluctuation physical quantity is greater than the physical quantity determination reference AR is determined, for a misfire determination.

If the engine 20 is operating at least in the overlap operation region as in the low load and low rotation speed region LL (Yes in S11), the misfire determination part 12 determines whether or not lowering of the rotation speed OMG and subsequent completion of the lowering are attributable to a misfire.

If the engine 20 is operating in the overlap operation region (Yes in S11), the misfire determination part 12 counts a determination period (S13). The misfire determination part 12 counts the determination period by counting the number of rotations of the crankshaft, for example.

Then, the misfire determination part 12 determines whether or not a differential between the second preceding physical quantity SOMG(2) and the first preceding physical quantity SOMG(1) is in the first reference range P1$a$ indicated in FIG. 5 (S14).

If step S14 results in determining that the differential is in the first reference range P1$a$ indicated in FIG. 5 (Yes in S14), the misfire determination part 12 determines that the rotation speed of the crankshaft may be possibly lowered by a misfire. In this case, the misfire determination part 12 determines whether or not a differential between the rotation speed fluctuation physical quantity SOMG(0) that is acquired at the current acquisition timing and the first preceding physical quantity SOMG(1) is in the second reference range P1$b$ indicated in FIG. 5 (S15). If the differential between the rotation speed fluctuation physical quantity SOMG(0) and the first preceding physical quantity SOMG(1) is within the second reference range P1$b$ (Yes in S15), the misfire determination part 12 determines that the lowering of the rotation speed has been completed.

If the foregoing determination results in determining both that the rotation speed of the crankshaft is lowered (Yes in S14) and that the lowering of the rotation speed is completed at the acquisition timing (Yes in S15), the misfire determination part 12 determines that a misfire has occurred. The misfire determination part 12 counts a misfire counter (S18).

On the other hand, if a result of the determination either in step S14 or in step S15 is negative (No in S14, or No in S15), the misfire determination part 12 determines that no misfire is occurring. In this case, the misfire determination part 12 skips counting of the misfire counter.

The misfire determination part 12 determines whether or not the determination period has elapsed (S19).

If the determination period has elapsed (Yes in S19), the misfire determination part 12 determines whether or not the value indicated by the misfire counter is greater than a reference value for notification (S22).

If the value indicated by an abnormal fluctuation counter is greater than the reference value (Yes in S22), the misfire determination part 12 directs the notification signal transmission part 16 to execute a process for notification (S23). The notification signal transmission part 16 accordingly transmits a notification signal to the notification device 30. The misfire determination part 12 directs the notification signal transmission part 16 to transmit the value indicated by the abnormal fluctuation counter, as the number of misfires.

Second Embodiment

Next, a second embodiment of the present teaching will be described.

The second embodiment of the present teaching is different from the first embodiment, in that its misfire pattern range P2 used for a misfire determination includes a third reference range Pc for which a determination is performed, too. The other points of the second embodiment are identical to those of the first embodiment. The second embodiment, therefore, will be described with use of the drawings for the first embodiment as well as the same reference signs as used in the first embodiment.

Figure 8:
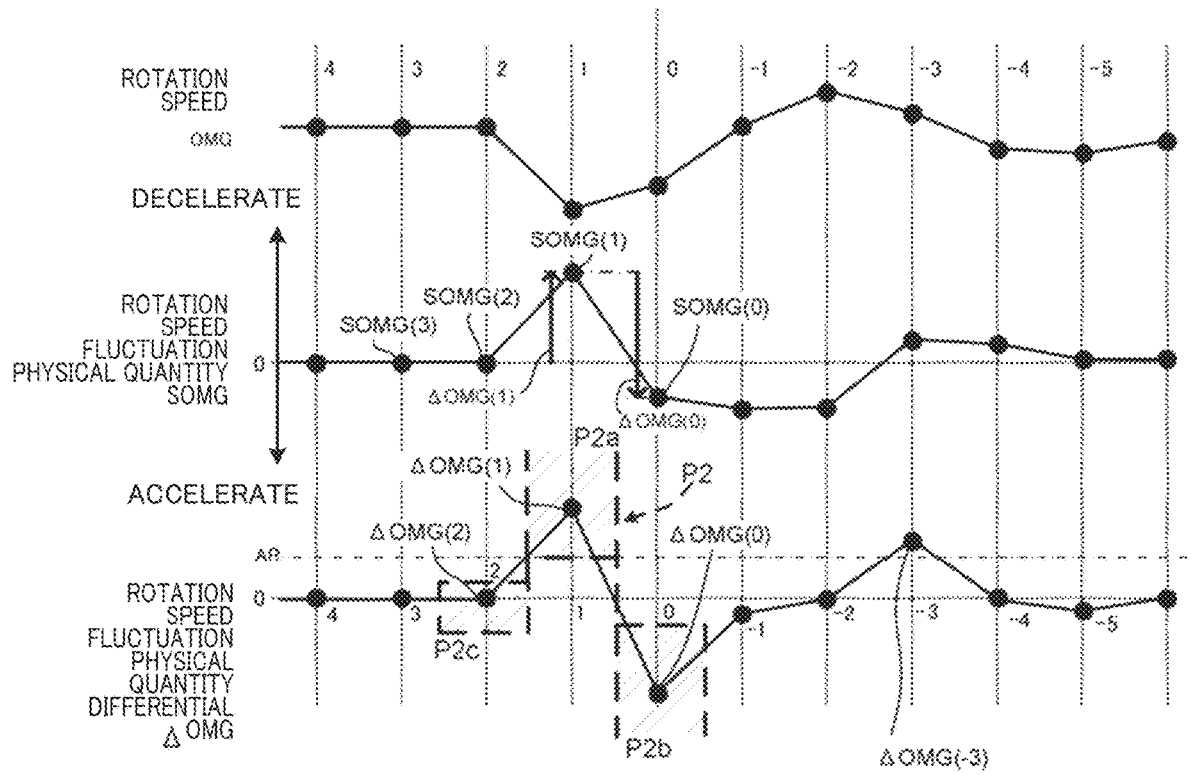
FIG. 8 Charts showing an exemplary rotation speed and an exemplary rotation speed fluctuation physical quantity according to a second embodiment of the present teaching FIG. 9 A flowchart showing operations of a misfire detection device according to the second embodiment of the present teaching FIG. 10 Charts showing an exemplary rotation speed and an exemplary rotation speed fluctuation physical quantity according to a third embodiment of the present teaching FIG. 11 Charts showing an exemplary rotation speed and an exemplary rotation speed fluctuation physical quantity according to a fourth embodiment of the present teaching

FIG. 8 is a chart showing an exemplary rotation speed and an exemplary rotation speed fluctuation physical quantity according to the second embodiment of the present teaching.

The misfire pattern range P2, which the misfire determination part 12 according to the this embodiment uses for a misfire determination, has three reference ranges P2a, P2b, P2c. The first reference range P2a is applied to the differential $\Delta OMG(1)$ of the first preceding physical quantity SOMG(1) from the second preceding physical quantity SOMG(2). The second reference range P2b is applied to the differential $\Delta OMG(0)$ of the rotation speed fluctuation physical quantity SOMG(0) from the first preceding physical quantity SOMG(1).

The third reference range P2c is applied to a differential $\Delta OMG(2)$ of the second preceding physical quantity SOMG(2) from a third preceding physical quantity SOMG(3).

If the value of the differential $\Delta OMG(1)$ is within the first reference range P2a, additionally the differential $\Delta OMG(0)$ is within the second reference range P2b, and further additionally the differential $\Delta OMG(2)$ is within the third reference range P2c, the misfire determination part 12 determines that lowering of the rotation speed OMG and subsequent completion of the lowering are attributable to a misfire. That is, the misfire determination part 12 evaluates a combination of the three differentials $\Delta OMG(1)$, $\Delta OMG(0)$, and $\Delta OMG(2)$.

Figure 9:
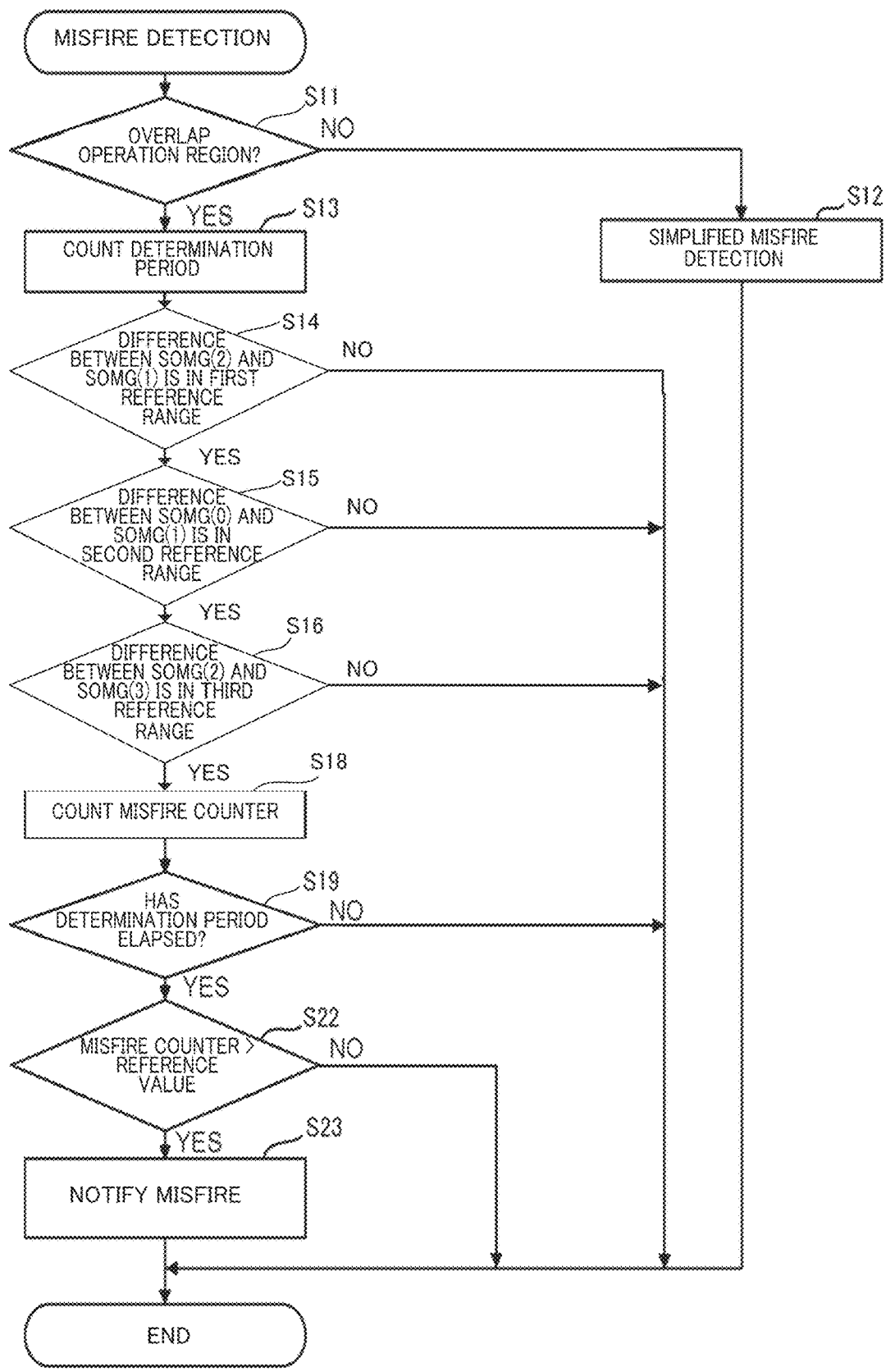

FIG. 9 is a flowchart showing operations of the misfire detection device according to the second embodiment of the present teaching.

A process performed by the misfire determination part 12 according to the embodiment is the same as the process in the first embodiment (see FIG. 7), except that whether or not the differential $\Delta OMG(2)$ is within the third reference range P2c is additionally determined (S16). The other points of the process are identical to those of the first embodiment.

Specifically, the misfire determination part 12 according to this embodiment determines that a misfire has occurred in the internal combustion engine, upon detecting all of: lowering of the rotation speed of the crankshaft 21 (see FIG. 1) at the first preceding timing ("1") based on the differential $\Delta OMG1$ between the first preceding physical quantity SOMG(1) and the second preceding physical quantity SOMG(2), the first preceding physical quantity SOMG(1) being a physical quantity that is acquired at the first preceding timing ("1") corresponding to a specific kind of stroke before the acquisition timing ("0") at which the rotation speed fluctuation physical quantity SOMG is acquired, the second preceding physical quantity SOMG(2) being a physical quantity that is acquired at the second preceding timing ("2") corresponding to the specific kind of stroke before the first preceding timing ("1"); completion of the lowering of the rotation speed OMG at the acquisition timing ("0") based on the differential $\Delta OMG0$ between the rotation speed fluctuation physical quantity SOMG(0) and the first preceding physical quantity SOMG(1); and a situation where the rotation speed of the crankshaft 21 at the second preceding timing ("2") is within a predetermined range based on the differential $\Delta OMG2$ between the third preceding physical quantity SOMG(3) and the second preceding physical quantity SOMG(2), the third preceding physical quantity SOMG(3) being a physical quantity that is acquired at the third preceding timing ("3") corresponding to the specific kind of stroke before the second preceding timing ("2"), the second preceding physical quantity SOMG(2) being a physical quantity that is acquired at the second preceding timing ("2").

In the misfire pattern range P2 of this embodiment, the first reference range P2a is identical to the first reference range P1a of the first embodiment. The second reference range P2b is identical to the second reference range P1b of the first embodiment.

In the misfire pattern range P2, the third reference range P2c has the upper limit and the lower limit. The size of the third reference range P2c in the misfire pattern range P2 depends on the value of the differential $\Delta OMG(1)$. The upper limit and the lower limit of the third reference range P2c are calculated by multiplying the value of the differential $\Delta OMG(1)$ by coefficients.

The upper limit of the third reference range P2c is equal to or less than the differential $\Delta OMG(1)$. In the example illustrated in FIG. 9, the upper limit of the third reference range P2c has a positive value. The lower limit of the third reference range P2c has a negative value. In other words, the third reference range P2c is set so as to include the differential $\Delta OMG=0$. The upper limit of the third reference range P2c is equal to or less than the differential $\Delta OMG(1)$. In the example illustrated in FIG. 9, the upper limit of the third reference range P2c is less than the lower limit of the first reference range P2a.

The third reference range P2c does not always need to be the range illustrated in FIG. 9. The third reference range P2c may be changed based on the amount of fluctuation in the rotation speed fluctuation physical quantity SOMG, for example. In such a case, the upper limit of the third reference range P2c is equal to or less than the differential $\Delta OMG(1)$. The lower limit of the third reference range P2c has a negative value.

For example, values obtained by multiplying the differential $\Delta OMG(1)$ by coefficients that represent a state of the straddled vehicle 50 can be set as the upper limit and the lower limit of the third reference range P2c. In such a case, the upper limit and the lower limit of the third reference range P2c are changed each time a differential $\Delta$OMG(1) is acquired. The upper limit of the third reference range P2c is set at a value equal to or less than the differential $\Delta$OMG(1). It however is possible that a value greater than the physical quantity determination reference AR is set as the upper limit of the third reference range P2c. It is also possible that a negative value is adopted as the upper limit of the third reference range P2c, for example. In such a case, the third reference range P2c does not include the differential $\Delta$OMG=0.

The third reference range P2c can be adjusted based on the type or the traveling state of the straddled vehicle 50 (see FIG. 2) to which the straddled vehicle engine unit EU is applied, for example.

In the engine 20 mounted to the straddled vehicle, a period of valve overlap, in which an exhaust valve and an intake valve are opened simultaneously, is long. This is why an exhaust gas resulting from combustion is present in the cylinder before another combustion. If a misfire occurs in the engine 20, however, an unburned gas remains in a cylinder where the misfire occurred. Consequently, a cylinder that undergoes the next combustion contains a reduced concentration of an exhaust gas resulting from combustion.

Accordingly, in a case of a misfire occurring in the engine 20, combustion in a cylinder next to a cylinder where the misfire occurred causes the rotation speed to be higher than normal. In this case, further next combustion makes the rotation speed return to the normal speed. Thus, once a misfire occurs in a cylinder, the rotation speed tends to repeat increasing and lowering thereafter.

In this embodiment, the misfire determination part 12 also detects that a fluctuation in the rotation speed fluctuation physical quantity in a period from the third preceding timing ("3") to the second preceding timing ("2") is within the third reference range P1c. This can suppress a situation where the above-described repeat of increasing and lowering of the rotation speed is erroneously detected as a misfire. Accordingly, a misfire can be detected with higher accuracy.

Third Embodiment

Next, a third embodiment of the present teaching will be described.

The third embodiment of the present teaching is different from the second embodiment, in that the acquisition timing at which the rotation speed fluctuation physical quantity is acquired, the first preceding timing, the second preceding timing, and the third preceding timing are at intervals of 720 crank angle degrees. The other points of the third embodiment are identical to those of the second embodiment. The third embodiment, therefore, will be described with use of the drawings for the second embodiment as well as the same reference signs as used in the second embodiment.

Figure 10:
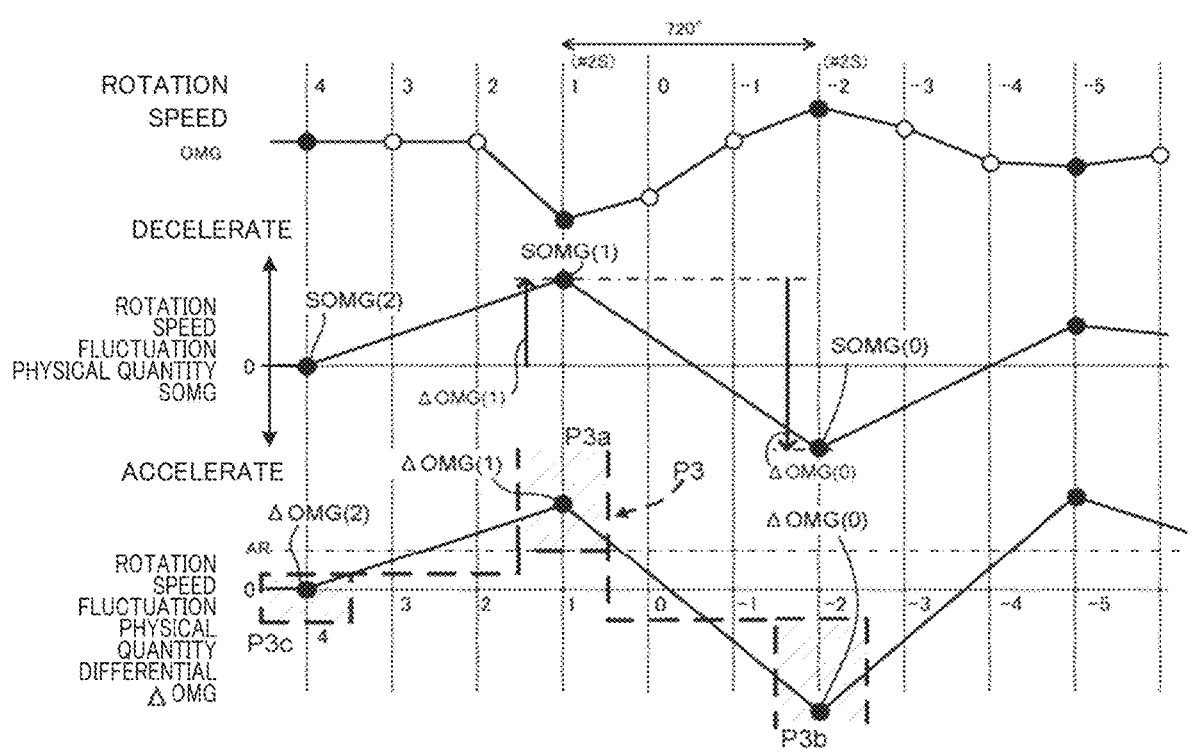

FIG. 10 is charts showing an exemplary rotation speed and an exemplary rotation speed fluctuation physical quantity according to the third embodiment of the present teaching.

The engine 20 (see FIG. 1 and FIG. 2) is a three-cylinder engine. Each cylinder included in the engine 20 undergoes a specific kind of stroke (for example, an intake stroke) every 720 crank angle degrees.

The misfire determination part 12 according to this embodiment performs a misfire determination based on a differential $\Delta$OMG between rotation speed fluctuation physical quantities SOMG that are obtained respectively at two strokes of the specific kind performed in the same cylinder.

The rotation speed OMG illustrated in FIG. 10 is identical to the rotation speed OMG illustrated in FIG. 5, which has been referred to in the first embodiment.

Here, a timing when the specific kind of stroke is performed in the second cylinder, for example, will be focused on. In response to acquisition of a rotation speed fluctuation physical quantity SOMG(0) at the timing "-2" corresponding to an intake stroke (#2S) of the second cylinder, the misfire determination part 12 refers to a rotation speed fluctuation physical quantity at the timing "1" corresponding to another intake stroke of the second cylinder, as a first preceding physical quantity SOMG(1). The misfire determination part 12 also refers to a rotation speed fluctuation physical quantity at the timing "4" corresponding to still another intake stroke of the second cylinder, as a second preceding physical quantity SOMG(2).

Thus, the misfire determination part 12 detects lowering of the rotation speed of the crankshaft at the first preceding timing ("1") based on a differential $\Delta$OMG(1) between the first preceding physical quantity SOMG(1) and the second preceding physical quantity SOMG(2). The first preceding timing ("1") is a timing corresponding to an intake stroke 720 crank angle degrees before the acquisition timing ("-2") at which the rotation speed fluctuation physical quantity SOMG(0) is acquired. The first preceding physical quantity SOMG(1) is a rotation speed fluctuation physical quantity that is acquired at the first preceding timing ("1"). The second preceding physical quantity SOMG(2) is a rotation speed fluctuation physical quantity that is acquired at the second preceding timing ("4") corresponding to an intake stroke 720 crank angle degrees before the first preceding timing ("1").

The misfire determination part 12 also detects completion of the lowering of the rotation speed at the acquisition timing ("-2") based on a differential $\Delta$OMG(0) between the rotation speed fluctuation physical quantity SOMG(0) and the first preceding physical quantity SOMG(1).

A differential $\Delta$OMG(2) at the second preceding timing ("4") corresponding to the intake stroke 720 crank angle degrees before the first preceding timing ("1") is also included in the conditions for determination by the misfire determination part 12.

The misfire determination part 12 according to this embodiment determines that lowering of the rotation speed OMG and subsequent completion of the lowering are attributable to a misfire, if the values of the differentials $\Delta$OMG(1), $\Delta$OMG(0), and $\Delta$OMG(2) are within the first reference range P3a, the second reference range P3b, and the third reference range P3c, respectively. That is, the misfire determination part 12 evaluates a combination of the three differentials $\Delta$OMG(1), $\Delta$OMG(0), and $\Delta$OMG(2).

The third reference range P3c of this embodiment, like the one of the second embodiment, can be changed based on the amount of fluctuation in the rotation speed fluctuation physical quantity SOMG. In such a case, the upper limit of the third reference range P3c is equal to or less than the differential $\Delta$OMG(1). The lower limit of the third reference range P3c has a negative value.

Fourth Embodiment

Next, a fourth embodiment of the present teaching will be described.

The fourth embodiment of the present teaching is different from the second embodiment, in that the fluctuation physical quantity acquisition part 11 (see FIG. 1) acquires a rotation speed itself instead of a differential between rotation speeds, as a rotation speed fluctuation physical quantity SOMG. That is, the fluctuation physical quantity acquisition part 11 outputs a rotation speed as a rotation speed fluctuation physical quantity SOMG.

Thus, the misfire determination part 12 determines by using a differential in the rotation speed as a differential $\Delta$OMG in the rotation speed fluctuation physical quantity.

The other points of the fourth embodiment are identical to those of the second embodiment. The fourth embodiment, therefore, will be described with use of the drawings for the second embodiment as well as the same reference signs as used in the second embodiment.

Figure 11:
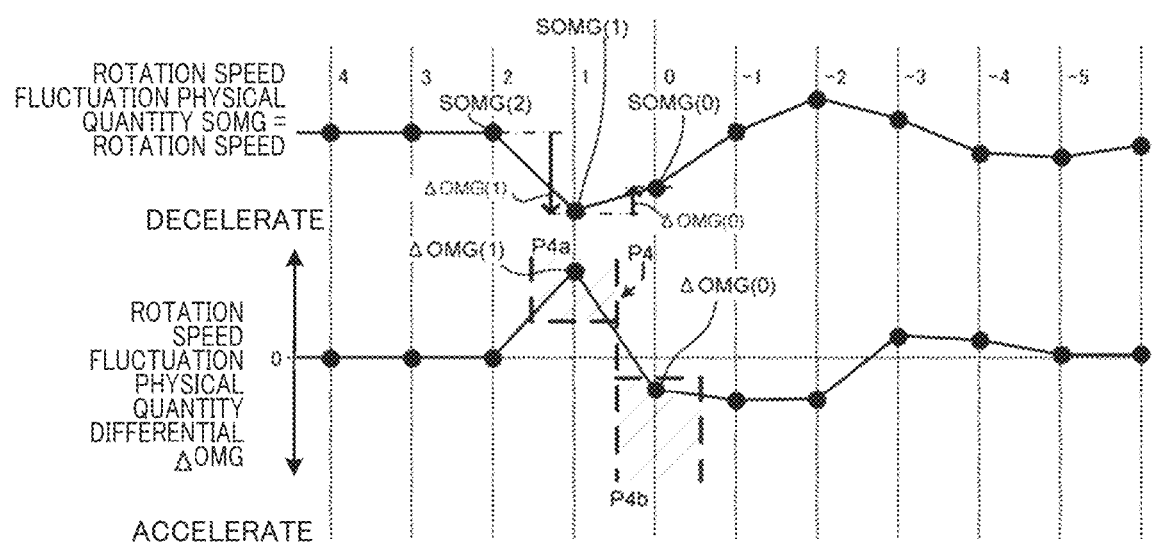

FIG. 11 is charts showing an exemplary rotation speed and an exemplary rotation speed fluctuation physical quantity according to the fourth embodiment of the present teaching.

The rotation speed illustrated in FIG. 11 is identical to the rotation speed illustrated in FIG. 5, which has been referred to in the first embodiment. In this embodiment, however, the rotation speed is used without any change as the rotation speed fluctuation physical quantity SOMG.

In response to acquisition of a rotation speed fluctuation physical quantity SOMG(0) at the timing "0" in FIG. 11, the misfire determination part 12 detects lowering of the rotation speed of the crankshaft at the first preceding timing ("1") based on a differential $\Delta$OMG(1) between a first preceding physical quantity SOMG(1) and a second preceding physical quantity SOMG(2). In this embodiment, the rotation speed fluctuation physical quantity SOMG(0), the first preceding physical quantity SOMG(1), and the second preceding physical quantity SOMG(2) are actually rotation speeds.

Referring to FIG. 11, a misfire pattern range P4 has two reference ranges P4a and P4b. The first reference range P4a is applied to the differential $\Delta$OMG(0) of the rotation speed fluctuation physical quantity SOMG(0) from the first preceding physical quantity SOMG(1). The second reference range P4b is applied to the differential $\Delta$OMG(1) of the first preceding physical quantity SOMG(1) from the second preceding physical quantity SOMG(2).

If the value of the differential $\Delta$OMG(1) is within the first reference range P4a and additionally the differential $\Delta$OMG(0) is within the second reference range P4b, the misfire determination part 12 determines that lowering of the rotation speed OMG and subsequent completion of the lowering are attributable to a misfire. That is, the misfire determination part 12 evaluates a combination of the plural differentials $\Delta$OMG(1) and $\Delta$OMG(0).

In this embodiment, the differential $\Delta$OMG is a first-order differential of the rotation speed. The differential $\Delta$OMG can be regarded as a first derivative of the rotation speed. The misfire determination part 12 determines whether or not a pattern of a combination of plural first-order differentials in the rotation speed is within a predetermined misfire pattern range.

The determination according to this embodiment as well can suppress the frequency of erroneous detection caused by an influence of the rotation speed rising on the rebound from its lowering due to a misfire. This allows a misfire to be detected with high accuracy.

In the determination using a rotation speed as a rotation speed fluctuation physical quantity, too, it may be possible that the misfire pattern range P4 is a misfire pattern range having three reference ranges including not only the two reference ranges P4a and P4b but also another reference range. In addition, it may be possible to use a rotation speed fluctuation physical quantity at a timing corresponding to a specific kind of stroke in the same cylinder as a preceding timing, like illustrated with FIG. 10, for example.

REFERENCE SIGNS LIST

EU straddled vehicle engine unit
10 misfire detection device
11 crankshaft rotation speed fluctuation physical quantity acquisition part (fluctuation physical quantity acquisition part)
12 misfire determination part (misfire determination unit)
20 engine (internal combustion engine)
21 crankshaft
27 crank angle signal output unit (angle signal output unit)
50 straddled vehicle
52b wheel (driving wheel)

The invention claimed is:

1. A straddled vehicle engine unit mountable to a straddled vehicle,
the straddled vehicle engine unit comprising:
an internal combustion engine, including
a crankshaft, and
a crank angle signal output unit that periodically outputs a crank angle signal in accordance with rotation of the crankshaft,
the internal combustion engine being configured to repeat at least two kinds of strokes on a cycle of every 720-degree rotation of the crankshaft; and
a misfire detection device, including a crankshaft rotation speed fluctuation physical quantity acquisition unit and a misfire determination unit, wherein
the crankshaft rotation speed fluctuation physical quantity acquisition unit is configured to acquire a physical quantity related to an amount of fluctuation in a rotation speed of the crankshaft in one kind of stroke, out of the at least two kinds of strokes, based on the crank angle signal from the crank angle signal output unit, and
the misfire determination unit is configured to perform a misfire determination in response to each acquisition of the crankshaft rotation speed fluctuation physical quantity, whereby the misfire determination unit determines that a misfire has occurred in the internal combustion engine upon detecting all of:
lowering of the rotation speed of the crankshaft at a first preceding timing based on a differential between a first preceding physical quantity and a second preceding physical quantity, the first preceding physical quantity being the physical quantity acquired at the first preceding timing, the second preceding physical quantity being the physical quantity acquired at a second preceding timing, the first preceding timing corresponding to the one kind of stroke before an acquisition timing at which the crankshaft rotation speed fluctuation physical quantity is acquired, the second preceding timing corresponding to the one kind of stroke before the first preceding timing,
completion of the lowering of the rotation speed at the acquisition timing based on a differential between the crankshaft rotation speed fluctuation physical quantity and the first preceding physical quantity, completion of the lowering of the rotation speed corresponding to rising or maintaining of the rotation speed, and a situation where the rotation speed of the crankshaft at the second preceding timing is within a predetermined range based on a differential between a third preceding physical quantity and the second preceding physical quantity, the third preceding physical quantity being a physical quantity that is acquired at a third preceding timing corresponding to the one kind of stroke before the second preceding timing, wherein the predetermined range has an upper limit of a positive value, and a lower limit of a negative value.

2. The straddled vehicle engine unit according to claim 1, wherein the internal combustion engine further includes at least two cylinders, the one kind of stroke at the first preceding timing is 720 crank angle degrees before at the acquisition timing at which the crankshaft rotation speed fluctuation physical quantity is acquired, and the one kind of stroke at the second preceding timing is 720 crank angle degrees before at the first preceding timing.

3. The straddled vehicle engine unit according to claim 1, wherein the crankshaft rotation speed fluctuation physical quantity acquisition unit acquires, as the physical quantity related to the amount of fluctuation in the rotation speed of the crankshaft in the one kind of stroke, a quantity that represents a differential between a first rotation speed at a first crank angle position in the one kind of stroke and a second rotation speed at a second crank angle position that is less than 720 crank angle degrees before the first crank angle position.

4. The straddled vehicle engine unit according to claim 3, wherein the misfire determination unit determines that a misfire has occurred in the internal combustion engine, upon detecting that a first change from the first preceding physical quantity to the crankshaft rotation speed fluctuation physical quantity and a second change from the second preceding physical quantity to the first preceding physical quantity have different positive or negative polarities.

5. The straddled vehicle engine unit according to claim 2, wherein the crankshaft rotation speed fluctuation physical quantity acquisition unit acquires, as the physical quantity related to the amount of fluctuation in the rotation speed of the crankshaft in the one kind of stroke, a quantity that represents a differential between a first rotation speed at a first crank angle position in the one kind of stroke and a second rotation speed at a second crank angle position that is less than 720 crank angle degrees before the first crank angle position.

6. A straddled vehicle comprising:

the straddled vehicle engine unit according to any one of claims 1 to 5; and a wheel that is driven by the internal combustion engine.

* * * * *